(12) United States Patent
Seed et al.

(10) Patent No.: US 10,404,601 B2
(45) Date of Patent: *Sep. 3, 2019

(54) LOAD BALANCING IN THE INTERNET OF THINGS

(71) Applicant: Convida Wireless, LLC, Wilmington, DE (US)

(72) Inventors: Dale N. Seed, Allentown, PA (US); Shamim Akbar Rahman, Cote St. Luc (CA); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,691

(22) Filed: Jul. 18, 2018

(65) Prior Publication Data
US 2019/0036825 A1    Jan. 31, 2019

Related U.S. Application Data

(63) Continuation of application No. 14/289,117, filed on May 28, 2014, now Pat. No. 10,057,173.

(60) Provisional application No. 61/827,875, filed on May 28, 2013.

(51) Int. Cl.
| | | |
|---|---|---|
| *H04L 12/24* | (2006.01) | |
| *H04L 12/803* | (2013.01) | |
| *H04W 4/70* | (2018.01) | |
| *H04L 29/08* | (2006.01) | |
| *H04W 4/08* | (2009.01) | |
| *H04W 4/38* | (2018.01) | |

(52) U.S. Cl.
CPC ........ *H04L 47/125* (2013.01); *H04L 67/1004* (2013.01); *H04L 67/1017* (2013.01); *H04L 67/1031* (2013.01); *H04L 67/12* (2013.01); *H04L 67/125* (2013.01); *H04W 4/08* (2013.01); *H04W 4/70* (2018.02); *H04W 4/38* (2018.02)

(58) Field of Classification Search
CPC .............. H04L 47/125; H04L 67/1004; H04L 67/1017; H04L 67/1031; H04L 67/12; H04L 67/125; H04W 4/70; H04W 4/08; H04W 4/38
USPC ....................................................... 709/226
See application file for complete search history.

(56) References Cited

U.S. PATENT DOCUMENTS

| | | |
|---|---|---|
| 6,101,508 A | 8/2000 | Wolff |
| 7,346,676 B1 | 3/2008 | Swildens et al. |
| 8,073,934 B1 | 12/2011 | Zhong et al. |
| 8,412,810 B1 | 4/2013 | Tompkins |
| 2001/0023440 A1 | 9/2001 | Franklin et al. |
| 2003/0061356 A1 | 3/2003 | Jason |
| 2004/0268358 A1 | 12/2004 | Darling et al. |

(Continued)

OTHER PUBLICATIONS

Winter et al, "RPL: IPv6 Routing Protocol for Low-Power and Lossy Networks", RFC #6550, Mar. 2012, 158 pages.

(Continued)

*Primary Examiner* — Ario Etienne
*Assistant Examiner* — Elizabeth Kassa
(74) *Attorney, Agent, or Firm* — BakerHostetler

(57) ABSTRACT

Disclosed herein are a variety of devices, methods, and systems for load balancing in the internet of things. Devices and other entities can be grouped together in a load balancing group and traffic for such devices balanced according to (Continued)

load balancing criteria. Groups may be discovered, created, manipulated, and deleted by various entities.

20 Claims, 24 Drawing Sheets

(56) References Cited

U.S. PATENT DOCUMENTS

| | | |
|---|---|---|
| 2005/0027862 A1 | 2/2005 | Nguyen et al. |
| 2005/0044127 A1 | 2/2005 | Jaiswal et al. |
| 2006/0026599 A1 | 2/2006 | Herington et al. |
| 2007/0002752 A1 | 1/2007 | Thibeault et al. |
| 2007/0058542 A1 | 3/2007 | Thibeault |
| 2007/0124476 A1 | 5/2007 | Desterreicher et al. |
| 2009/0259736 A1 | 10/2009 | Chang et al. |
| 2011/0083179 A1 | 4/2011 | Lawson et al. |
| 2011/0276695 A1 | 11/2011 | Maldaner |
| 2013/0198340 A1 | 8/2013 | Ukkola et al. |
| 2013/0201827 A1 | 8/2013 | Zhang |
| 2014/0050083 A1 | 2/2014 | Layman et al. |

OTHER PUBLICATIONS

Vasseur et al, "Routing Metrics Used for Path Calculation in Low-Power and Lossy Networks", Internet Engineering Task Force (IETF), RFC 6551, Mar. 2012, 31 pages.

Shelby, Z., "CoRE Link Format draft-ietf-core-link-format-14", CoRE Internet-Draft, Jun. 1, 2012, 25 pages.

Shelby, Z. "Constrained RESTful Environments (CoRE) Link Format", Internet Engineering Task Force (IETF), RFC 6690, Aug. 2012, 22 pages.

Shelby et al, "CoRE Resource Directory draft-shelby-core-resource-directory-05", CoRE Internet-Draft, Feb. 25, 2013, 27 pages.

Montenegro et al, "Transmission of IPv6 Packets over IEEE 802.15.4 Networks", RFC #4944, Sep. 2007, 30 pages.

Levis et al, "The Trickle Algorithm", Internet Engineering Task Force (IETF), RFC #6206, Mar. 2011, 13 pages.

International Application No. PCT/US2014/039768: International Search Report and the Written Opinion dated Oct. 10, 2014, 10 pages.

Hui, J. and Thubert, P., "Compression Format for IPv6 Datagrams over IEEE 802.15.4-Based Networks", RFC #6282, Sep. 2011, 24 pages.

Gnawali, O. and Levis, P., "The Minimum Rank with Hysteresis Objective Function", Internet Engineering Task Force (IETF), RFC #6719, Sep. 2012, 13 pages.

LOAD BALANCING IN THE INTERNET OF THINGS

CROSS-REFERENCE TO RELATED APPLICATIONS

This application is a continuation of U.S. patent application Ser. No. 14/289,117, filed May 28, 2014, which claims the benefit of U.S. Provisional Patent Application No. 61/827,875, filed on May 28, 2013, entitled "LOAD BALANCING IN THE INTERNET OF THINGS", the contents of which are hereby incorporated by reference herein.

BACKGROUND

Current network and communications technologies, such as machine-to-machine (M2M) technologies and the Internet, allow devices to communicate more directly with each other using wired and wireless communications systems. M2M technologies in particular enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

As with any network having numerous entities, devices, etc., that may perform similar functions, balancing traffic between such entities where possible is important to manage the utilization of available bandwidth and entity resources. For example, where there are multiple paths between two entities, it may be desirable to spread traffic between the two entities so that one or some subset of the multiple paths does not become overloaded. Similarly, where there are multiple entities that are capable of providing the same surface, it may be desirable to spread requests for that service across the multiple entities so that one or a subset of the multiple entities does not become overloaded.

SUMMARY

Embodiments disclosed herein include methods for receiving, at an entity in a network of connected entities, a request to create a load balancing group and in response creating the load balancing group. Entities may be selected for addition to the load balancing group from among eligible load balancing group devices and then added to the group. Traffic associated with the devices may then be load balanced across the devices in the group.

Embodiments disclosed herein further include an entity in a network of connected entities that may, when executing stored instructions, receive a request to create a load balancing group and in response create the load balancing group. The entity may select for addition to the load balancing group from among eligible load balancing group devices and then added to the group. Traffic associated with the devices may then be load balanced across the devices in the group.

Embodiments disclosed herein further include an IoT proxy that may, when executing stored instructions, receive a request to create a load balancing group and in response create the load balancing group. The proxy may select for addition to the load balancing group from among eligible load balancing group devices and then added to the group. Traffic associated with the devices may then be load balanced across the devices in the group.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
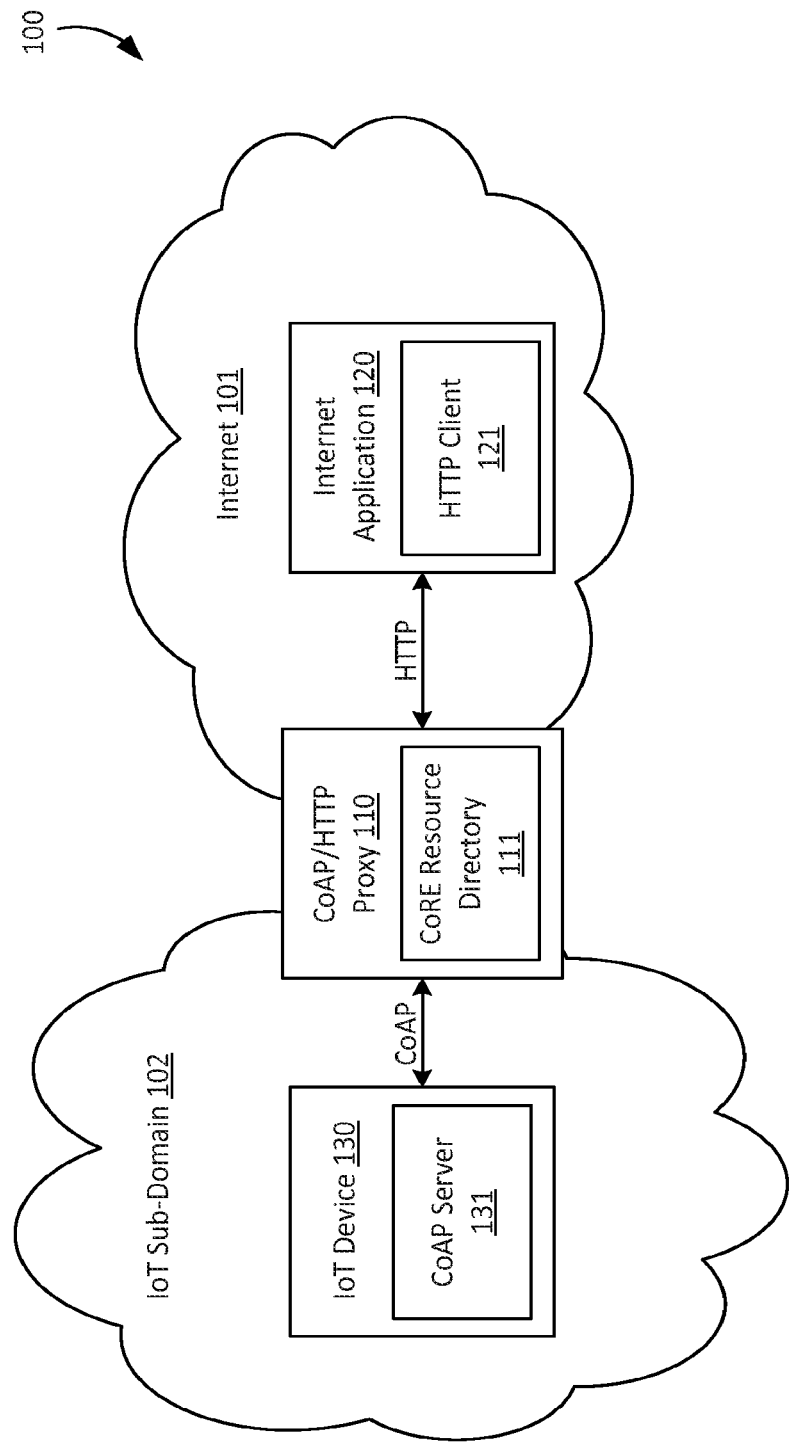
FIG. 1 illustrates an exemplary network configuration according to an embodiment.

The embodiments set forth herein may be described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements will be described. In a RESTful architecture, representations of uniquely addressable resources may be transferred between entities. One skilled in the art will recognize that implementations of the instant embodiments may vary while remaining within the scope of the present disclosure. One skilled in the art will also recognize that the disclosed exemplary embodiments, while sometimes described herein in reference to standards set forth by standards bodies such as the Internet Engineering Taskforce (IETF), the European Telecommunications Standards Institute (ETSI), and oneM2M, are not limited to implementations adhering to such standards. The disclosed embodiments may be implemented in systems that do not adhere to the standards established by these standards bodies and may be applied to any type of architecture or systems that has communicatively connected entities.

There are several exemplary load balancing techniques that may be used in large networks such as the Internet. Among these techniques is domain name service (DNS) load balancing that sends DNS requests across a set of identically or similarly configured DNS hosts. Various algorithms may be used to implement such a technique, including the load balancing mechanism often referred to as round-robin, where DNS. Round robin DNS may be used to load balance requests between a number of web servers listed in the DNS hosts as associated with a domain name. For example, a company can have one domain name (e.g., cnn.com) and three identical copies of the same web site residing on three distinct web servers with three different IP addresses. When one client performs a DNS query to resolve the domain name cnn.com it will be sent to the first IP address. When a second client performs a similar DNS query to resolve cnn.com, it will be sent to the next IP address, and a third client will be sent to the third IP address. When a fourth client performs a DNS query to resolve cnn.com, it will be sent to the first IP address, and so on.

Another exemplary load balancing technique is hypertext transfer protocol (HTTP) proxy load balancing where an HTTP load balancing proxy is used in the network to organize HTTP servers with the same functionality into a load balancing group and distribute HTTP requests across servers in the group using an algorithm such as round-robin based.

In some embodiments, HTTP caching, while not necessarily considered a load balancing, may complement load balancing mechanisms such as a HTTP load balancing proxy. For example, caching of HTTP GET responses by an HTTP load balancing proxy may allow it to service future requests using cached responses without having to forward the request to one of the HTTP servers in the targeted load balancing group, thereby reducing the load on the HTTP servers in the group.

In other embodiments, load balancing of routing paths may be included in the forwarding process of a network router and may be automatically activated if a routing table in the router has multiple paths to a destination. Such embodiments may be implemented using standard routing protocols, such as Routing Information Protocol (RIP), RIPv2, Enhanced Interior Gateway Routing Protocol (EIGRP), Open Shortest Path First (OSPF), and Interior Gateway Routing Protocol (IGRP), or derived from statically configured routes and packet forwarding mechanisms. The router may use multiple paths to a destination when forwarding packets based on the routing table information that indicates the multiple paths have the same cost (e.g., distance, administrator set cost, etc.) to the destination. For example, a router may use a round-robin scheme to balance the forwarding of the packets across the multiple paths. Various other router load balancing techniques may also be used, such as taking link characteristics like delay, packet loss rate, number of retransmissions, into account when steering traffic among multiple routes.

Many exemplary IoT use cases that implement the disclosed embodiments involve the deployment of large numbers of similar and/or identical types of devices in a localized area. For example, IoT networks may consist of large numbers of resource constrained wireless sensors and/or actuators deployed across a farmer's field, a military combat zone, a shopping mall, etc.

Enhancement of architectures and protocols that were initially used on the Internet may be used in some embodiments to support IoT devices and networks. For example, IPv6 over Low power Wireless Personal Area Networks (6LoWPAN), a version of the IPv6 networking protocol, Routing Protocol for Low-power and Lossy Networks (RPL), may be used with resource constrained IoT devices, Constrained Application Protocol (CoAP), Constrained RESTful Environments (CoRE) Link Format, and CoRE Resource DirectoryREST may each be used in some embodiments to provide services that include a focus on a system's resources, including how resource states are addressed and transferred over HTTP by a wide range of clients written in different languages. As used herein, a protocol or architecture may be referred to as RESTful when in compliance with principles of REST.

In these IoT networks, IoT devices may have the capability to function as smaller scale CoAP web servers that can service RESTful requests similar to existing HTTP web servers. However, such CoAP servers may be quite resource constrained in comparison to traditional HTTP servers. For example, many CoAP servers may be battery powered and may have limited computing resources (e.g., memory, processor, etc.). As a result, the number and rate of requests that an individual CoAP server may be able to effectively service may be limited. Another attribute of many IoT networks is they typically consist of multiple (and in some cases large numbers of) CoAP servers that are functionally equivalent to one another (e.g., networks with multiple temperature, humidity, and pressure sensors, etc.). In addition, IoT networks may leverage less resource constrained CoAP proxies that proxy between CoAP networks and the HTTP-based general Internet.

In many IoT networks, direct discovery of resources hosted on IoT devices may not be practical due to sleeping IoT devices, dispersed networks, or networks where multicast traffic may be inefficient. These problems may be addressed in some embodiments through the use of a Resource Directory (RD) that may contain descriptions of resources hosted on IoT devices, allowing lookups to be performed for those resources as the RD. CoAP proxies may provide a convenient place in an IoT network to host RD mechanisms, such as CoRE Resource Directories (RD) that enable resources hosted on CoAP servers to be discovered by users in the general Internet (e.g., HTTP Clients). For example, in exemplary system 100 of FIG. 1, IoT subdomain 102 may be interconnected to the general Internet via CoAP/HTTP proxy 110 that is hosting CoRE resource directory 111. HTTP client 121 hosted by Internet application 120 may discover resources hosted by CoAP server 131 executing on IoT device 130 by querying CoRE RD 111. CoAP/HTTP proxy 110 may receive HTTP communications from Internet application 120 and send communications to Internet application 120 in HTTP, while receiving CoAP communications from IoT device 130 and sending communications to IoT device 130 in CoAP, translating between the two protocols as needed to allow communication between Internet application 120 and IoT device 130.

Many IoT networks are made up of resource constrained sensor and actuator type devices. Due to their limited processing, memory, and energy resources, these devices may become overloaded by incoming requests to access the device's sensors and/or actuators. In networks with such devices, load balancing HTTP proxies and load balancing DNS servers may not work well to balance loads across those devices for several reasons. HTTP load balancing proxies may be implemented in a proprietary manner and require network administrators to manually set up and manage them since there may be a lack of protocols to support automated HTTP load balancing proxies. This is problematic since many IoT based networks will not be managed by a network administrator. For example, IoT networks may be deployed in an ad-hoc fashion and/or not closely managed by a knowledgeable network administrator because one is not available (e.g., in a home network). In addition, many IoT networks will include transient or mobile IoT devices which host CoAP/HTTP server functionality that will come and go, which may make manual configuration and management difficult and burdensome.

DNS load balancing may also not be not well-suited for many types of IoT deployments because DNS servers use Fully Qualified Domain Names (FQDNs) (e.g., cnn.com) which is an addressing means that may not be used in many IoT networks. Instead, many IoT implementations simply use IPv6 addressing because, unlike on the Internet, where humans are the main clients and benefit from easily memorized FQDNs, in many IoT and M2M networks, machines communicate with one another and FQDNs are of less value.

Many IoT networks will not be well-suited for DNS server deployments. Hosting a DNS server may not be feasible due to resource constrained nodes or due to a lack of a qualified DNS administrator. In addition, IoT devices hosting HTTP/CoAP servers may dynamically join and leave networks with much higher frequency than traditional Internet HTTP servers. This makes managing DNS records for these types of networks more difficult. Also, the DNS client protocol may be too heavy-weight for some resource constrained IoT devices.

Figure 2:
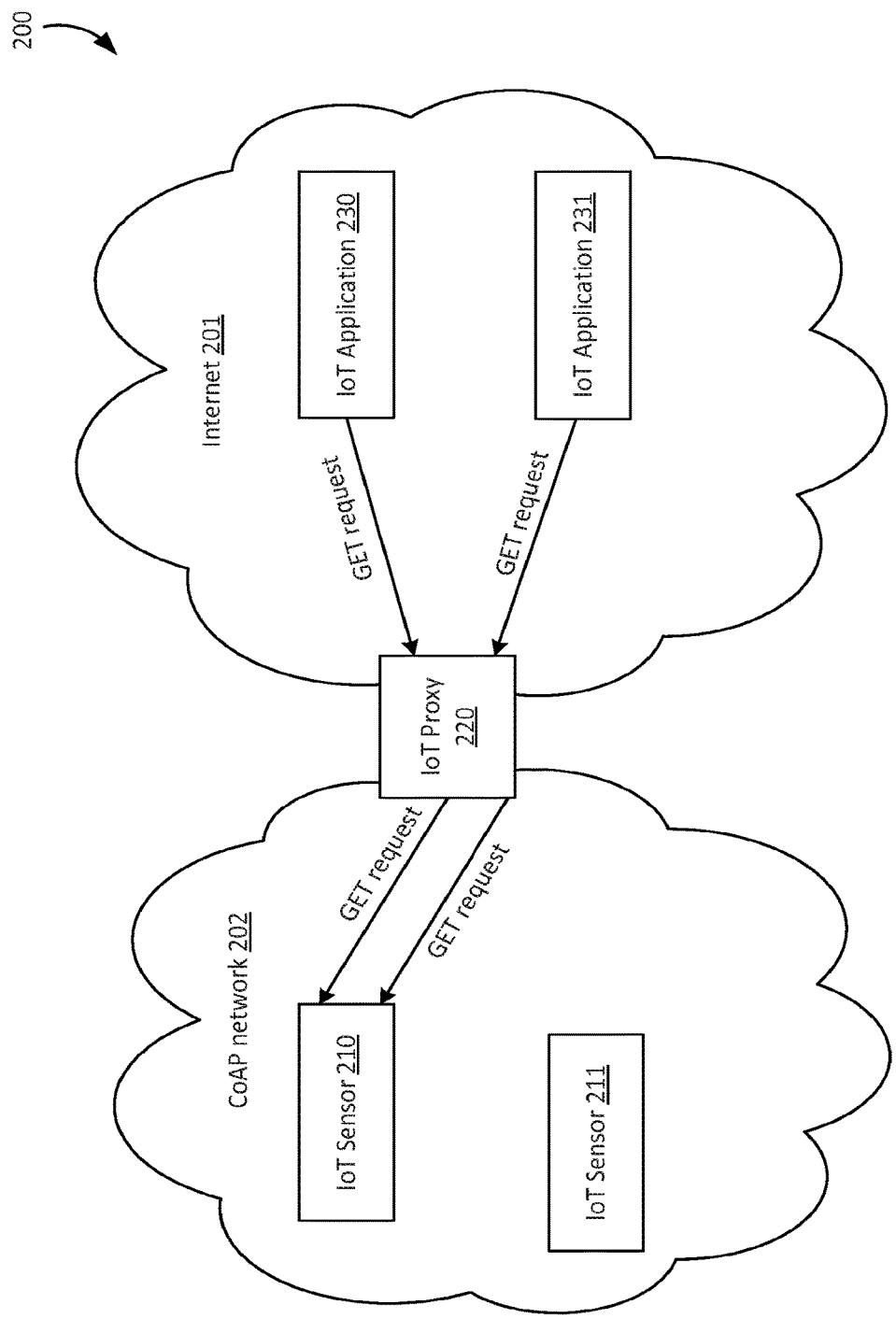
FIG. 2 illustrates an exemplary network configuration according to an embodiment.

FIG. 2 illustrates exemplary system 200 that illustrates an example of the problems that may occur without proper load balancing. IoT sensors in CoAP network 202 may be functionally equivalent, resource constrained temperature sensors. These temperature sensors may be owned and operated by a weather service company or agency such as a government owned national weather service. Each temperature sensor may host an IoT CoAP server that supports servicing temperature-reading GET requests. The CoAP network may be interfaced to the broader Internet 201 via IoT proxy 220. The IoT proxy may be owned by an M2M network or service provider. IoT proxy 220 may acts as a reverse proxy for the IoT CoAP servers hosted on sensors 210 and 211. The proxy may also performs CoAP/HTTP protocol translation.

The example also includes IoT applications 230 and 231 that may be hosted on separate user smart phones. IoT applications 230 and 231 may each perform temperature reading GET requests. These requests may be targeted towards IoT proxy 220, which may in turn forward them to a corresponding CoAP IoT server hosted one of sensors 210 and 211. The forwarding by IoT proxy 220 may be based on the particular temperature sensor each IoT application determines to target. Since there is no coordination between the smart phones and no load balancing mechanisms supported in network 202, both requests may happen to target, and therefore may be forwarded to, IoT sensor 210. As a result, the load induced by servicing the requests (i.e. communication, processing, and computation) on IoT sensor 210 is greater than the load on IoT sensor 211. Over time, this load imbalance may have adverse effects on IoT sensor 210 (e.g., drain its battery more quickly) and/or network 202 (congest one area of the network).

Figure 3:
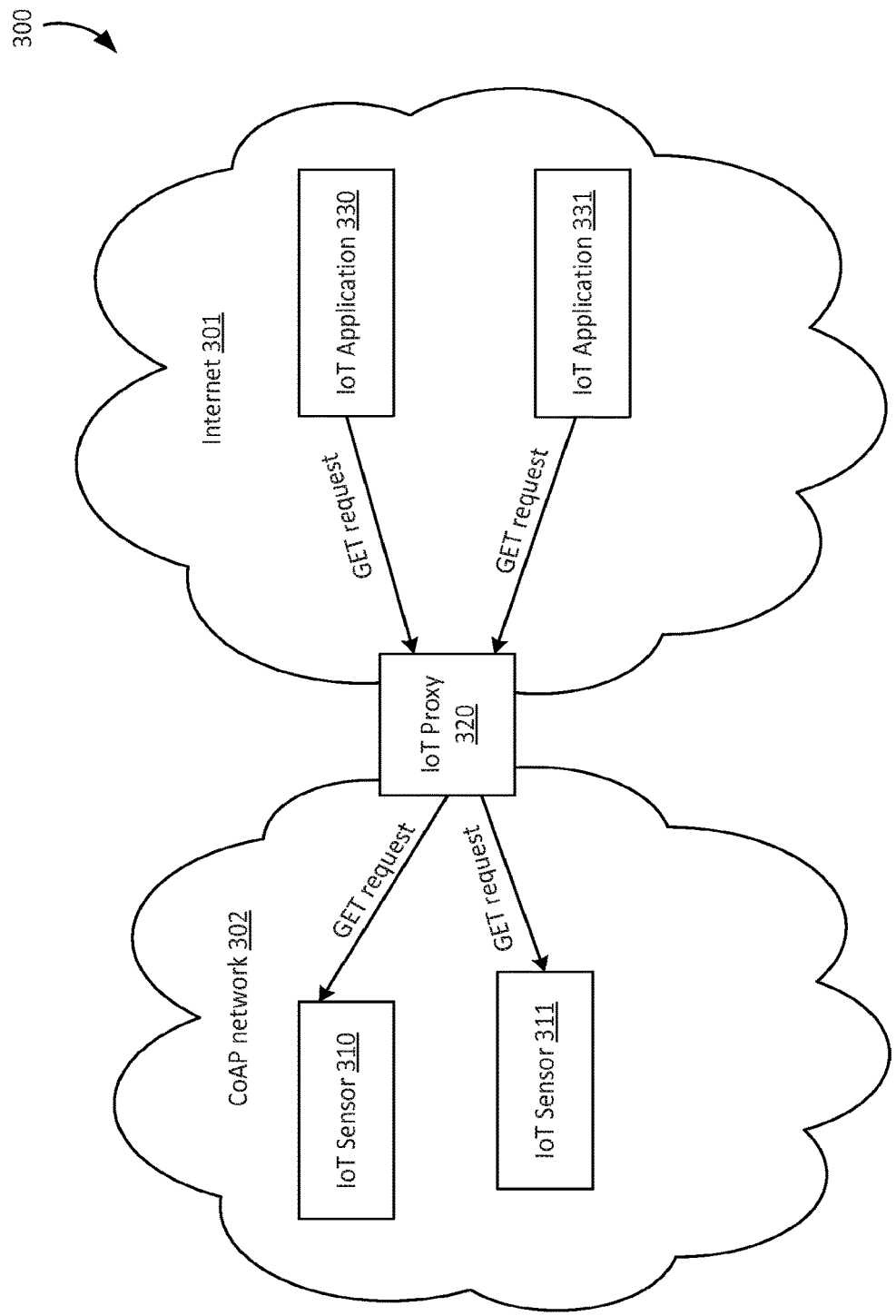
FIG. 3 illustrates an exemplary network configuration according to an embodiment.

To address these problems, automated and dynamic load balancing (LB) mechanisms for RESTful IoT networks may be utilized according to the disclosed embodiments. Similar to the example of FIG. 2, FIG. 3 illustrates exemplary system 300 that illustrates how proper load balancing may improve the performance of IoT networks and devices. IoT sensors in CoAP network 302 may be functionally equivalent, resource constrained temperature sensors. These temperature sensors may be owned and operated by a weather service company or agency such as a government owned national weather service. Each temperature sensor may host an IoT CoAP server that supports servicing temperature-reading GET requests. The CoAP network may be interfaced to the broader Internet 301 via IoT proxy 320. The IoT proxy may be owned by an M2M network or service provider. IoT proxy 320 may acts as a reverse proxy for the IoT CoAP servers hosted on sensors 310 and 311. The proxy may also performs CoAP/HTTP protocol translation.

The example also includes IoT applications 330 and 331 that may be hosted on separate user smart phones. IoT applications 330 and 331 may each perform temperature reading GET requests. These requests may be targeted towards IoT proxy 220, which may in turn forward them to a corresponding CoAP IoT server hosted one of sensors 210 and 211. The forwarding by IoT proxy 320, rather than only being based on the particular temperature sensor each IoT application determines to target, may also, or instead, be based one or more of the load balancing embodiments set forth herein. As a result, IoT proxy 320 may send one GET request to sensor 310 and another to sensor 311. By using such embodiments, over time, this load may be more evenly balanced across sensors thus ensuring that any adverse effects, such as battery drainage and network congestion, are diluted or at least distributed across devices and the network, thereby reducing the potential for user impact.

The disclosed embodiments, addressed in more detail below, will describe an IoT architecture that defines RESTful IoT LB mechanisms supporting automated and dynamic configuration and management of LB groups. The IoT architecture may include one or more (and as many as all) of an IoT LB proxy that supports autonomously forming and disbanding LB groups and distributing requests across IoT devices that are members of the same LB group, IoT LB aware devices that support publishing and discovery of LB information as well as the forming, joining, leaving, and disbanding of LB groups, and IoT LB aware applications that support discovery, creation and configuration of LB groups. These automated mechanisms may be well-suited for IoT networks that in many cases do not have interaction with human beings and cannot rely on a network administrator for management of LB groups. IoT LB group addressing schemes based on upon the definition of a LB group uniform resource identifier (URI) are also described.

IoT LB procedures that incorporate these LB mechanisms will also be set forth herein. These procedures may include one or more (and as many as all) procedure(s) for IoT applications and devices to discover LB groups (e.g., hosted on an IoT LB proxy), procedure(s) for an IoT device to form/join/leave/disband LB group and configure LB policies, and procedure(s) for an IoT LB proxy to discover LB preferences and candidacy of resource constrained IoT devices and autonomously form/disband/manage LB groups on their behalf An embodiment is also set forth that defines enhancements to the CoRE link format Internet media type and the CoRE Resource Directory for LB group functionality. These enhancements may include one or more (and as many as all) of mechanisms to publish and discover LB preferences of IoT devices and LB capabilities of IoT LB proxies via an enhanced CoRE Link Format description, mechanisms to publish and discover existing IoT LB groups, mechanisms to form/join/leave/disband an IoT LB group, and mechanisms to create/update/delete IoT LB policies.

Figure 4:
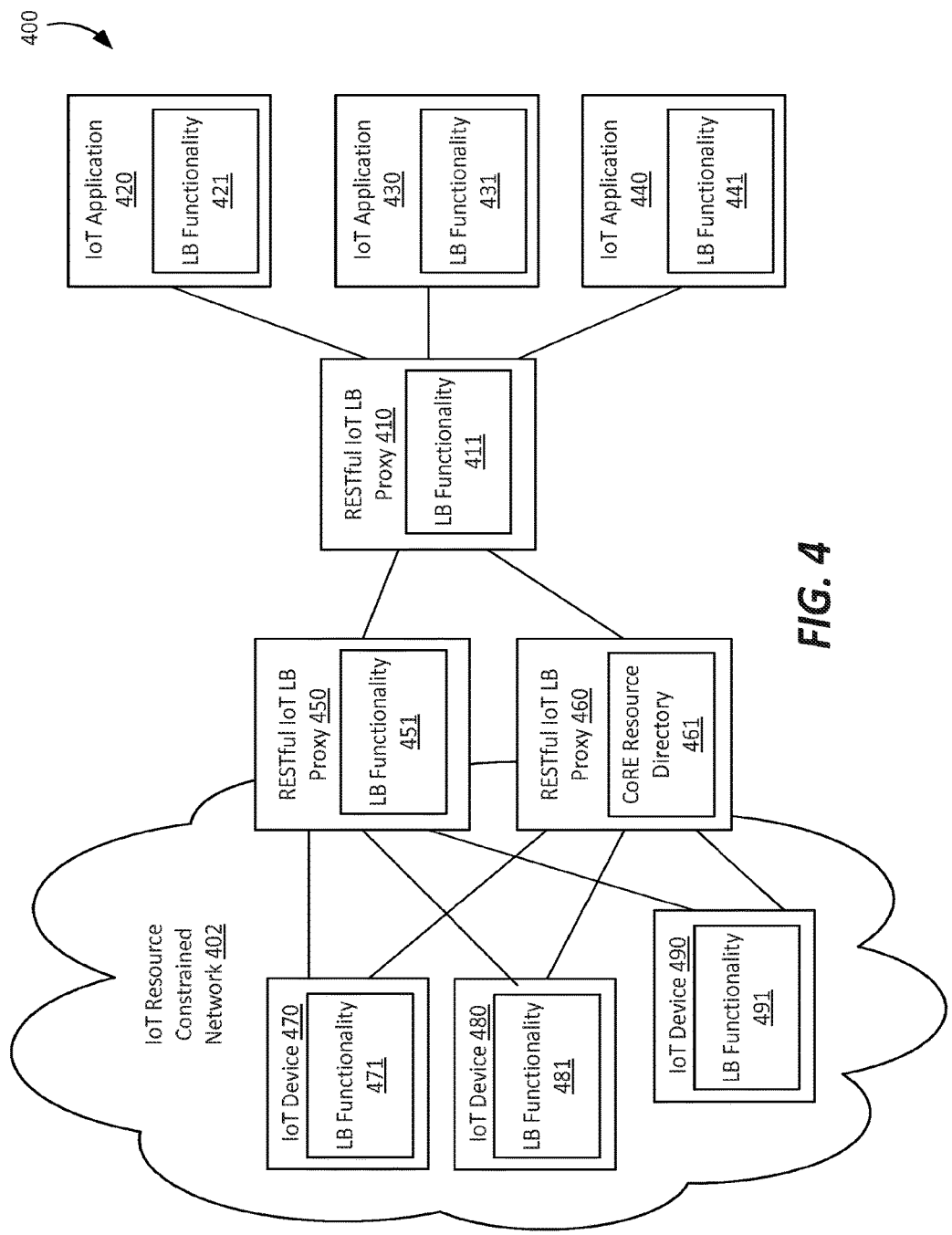
FIG. 4 illustrates an exemplary network configuration according to an embodiment.

This disclosure sets forth mechanisms that support automated and dynamic LB for RESTful IoT networks. FIG. 4 depicts illustrative architecture 400 that includes LB functionalities hosted on RESTful IoT LB proxies, RESTful IoT devices, and RESTful IoT applications. Via the disclosed LB mechanisms, two major types of LB may be supported in IoT networks.

First, LB of RESTful IoT application requests may occur across a group of resource constrained IoT devices. For example, a set of functionally equivalent IoT sensors (e.g., IoT devices 470, 480, and 490 in IoT resource constrained network 402) may measure the same property, such as the temperature of the room in which they are configured. These devices may be grouped together into a LB group in order to distribute requests amongst themselves and avoid overloading any one single sensor.

A second type of disclosed LB mechanism may be the LB of RESTful IoT application requests across a group of IoT LB proxies. For example, resource constrained IoT network 402 may be connected to the Internet via RESTful IoT LB proxy 410. To avoid congestion and provide redundancy, many deployments may use multiple proxies instead of just a single proxy, and therefore RESTful IoT LB proxies 450 and 460 may also be configured in system 400. To support LB, proxies 410, 450, and 460 may be grouped together into a LB group. By targeting this LB group, RESTful requests may be load balanced across the proxies effectively and prevent congestion bottlenecks on any one single proxy. LB determinations may be performed by the respective LB functionality in each proxy (i.e., LB functionality 411, LB functionality 451, LB functionality 461).

The disclosed LB mechanisms may allow for the load balancing of all the different types of RESTful methods (e.g., GET, PUT, POST, and DELETE); however, depending the implemented embodiment, load balancing of only one or more particular types of methods may performed. For example, for the set sensor devices 471, 481, and 491, load balancing of GET requests to these sensors may only be applicable, and PUTs may not be load balanced. Alternatively, for a set of redundant actuators controlling a given machine, both GET and PUT requests may be load balanced but no other requests or messages. Also note, that these LB mechanisms may co-exist with direct addressing of a specific device and/or resource. For example, a device may be a member of a LB group and receive a request targeted towards the LB group while at the same time it can also receive requests that are directly targeted towards the device itself Via the mechanisms in this disclosure, automated LB may be realized in IoT networks without requiring the presence of network administrators to manually configure and manage LB groups. This satisfies a key objective for many IoT networks that are deployed without being actively managed by a network administrator.

Figure 5:
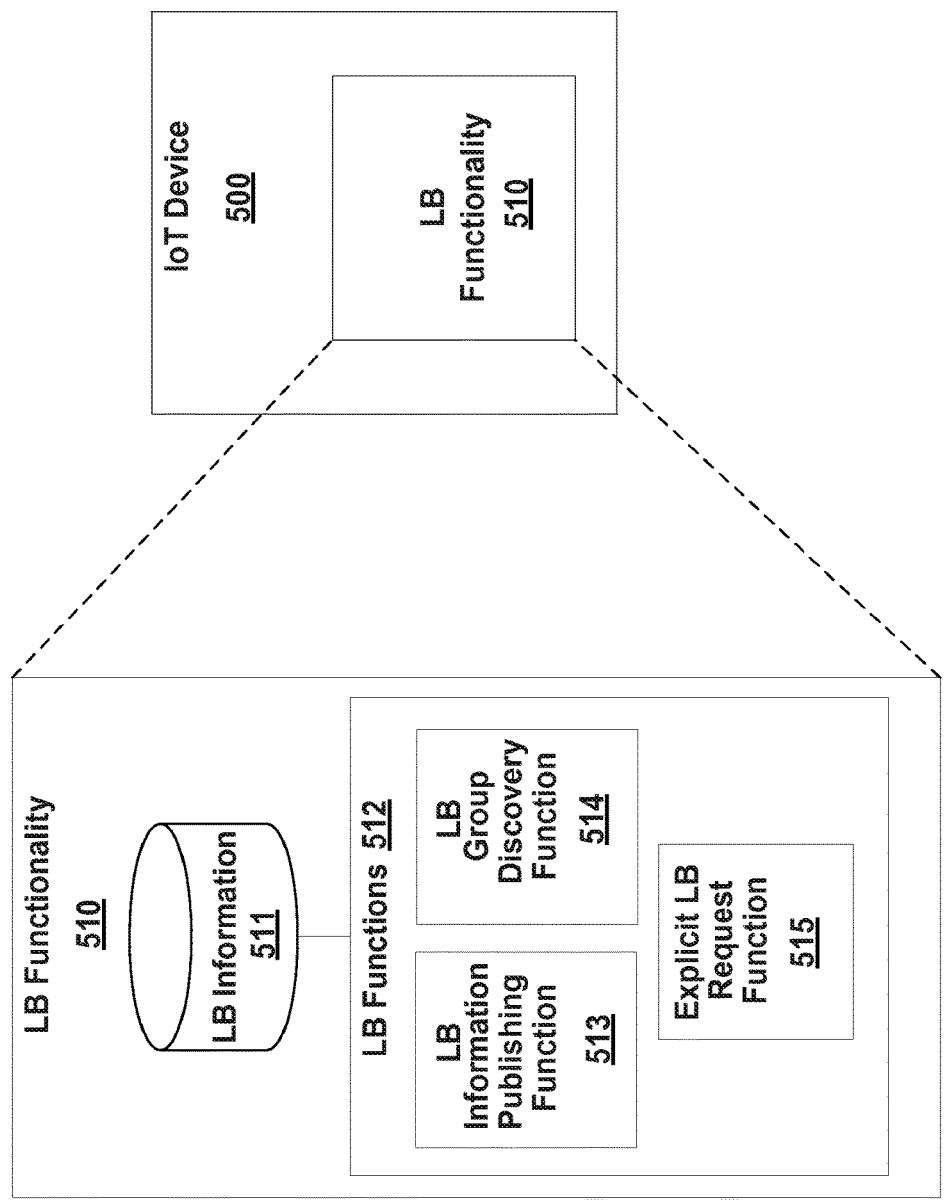
FIG. 5 illustrates an exemplary device configuration according to an embodiment.

FIG. 5 illustrates exemplary IoT device 500 that may include LB functionality 510. Note that an IoT device can host multiple resources and each resource may be a member of one or more LB groups. An example of a resource is a temperature sensor resource. By having a resource that is a member of a LB group, a device may benefit from LB of requests directed to that resource with request directed to similar resources hosted by other IoT devices in its network.

LB functionality 510 of IoT device 500 may host various forms of LB information 511, such as the information described in Table 1 below. LB information 511 may be pre-provisioned on IoT device 500 or dynamically updated (e.g., during manufacturing, during deployment, by a management entity in the network, etc.).

IoT device 500 may also support a variety of LB functions 512, including LB group discovery function 514 that may issue discovery requests (e.g., to an IoT LB Proxy), find available LB groups (if any) that are active in IoT device 500's network domain, and find information pertaining to the available groups (e.g., group type, address, policies, etc.). This function may perform discovery by querying an IoT LB RD and/or proxy. Such a query may specify one or more particular types of LB groups or it may be a general query to find all available groups. Upon receiving a discovery response from an IoT LB RD and/or proxy, IoT device 500 may parse the results to find available LB groups of interest (if any).

IoT device 500 may also support LB information publishing function 513 that may publish LB information to other entities in IoT device 500's network domain such as an IoT LB proxy or a LB RD. Publishing may facilitate easier discovery of IoT device 500's LB information 511 and may also be used by IoT device 500 to express its interest or candidacy in joining an LB group. By using LB publishing information function 513, IoT device 500 may express its interest in joining one or more particular types or specific instances of LB groups. This information may be used by IoT proxies to determine whether to add an IoT device resource into a LB group (as described elsewhere in this disclosure). Alternatively, LB information may be published locally on IoT device 500 (e.g., via an addressable discovery resource) such that it may retrieved, for example by an IoT LB proxy).

IoT device 500 may also support explicit LB request function 515 that issues LB requests to an IoT LB proxy. Instead of publishing LB information and relying on an IoT LB proxy to autonomously add an IoT device resource to a load balance group, this function may be used by IoT device 500 to issue a request to an IoT LB proxy instead. Via this function, IoT device 500 may request to form, join, leave, or disband an IoT LB group hosted on an IoT LB proxy. For example, IoT device 500 may request to join an existing LB group (e.g., one that it discovers) or it may request to form and join a new group. Via this function, IoT device 500 may also, or instead, create a new LB policy and update or delete an existing policy for which it has proper permissions to do so.

Figure 6:
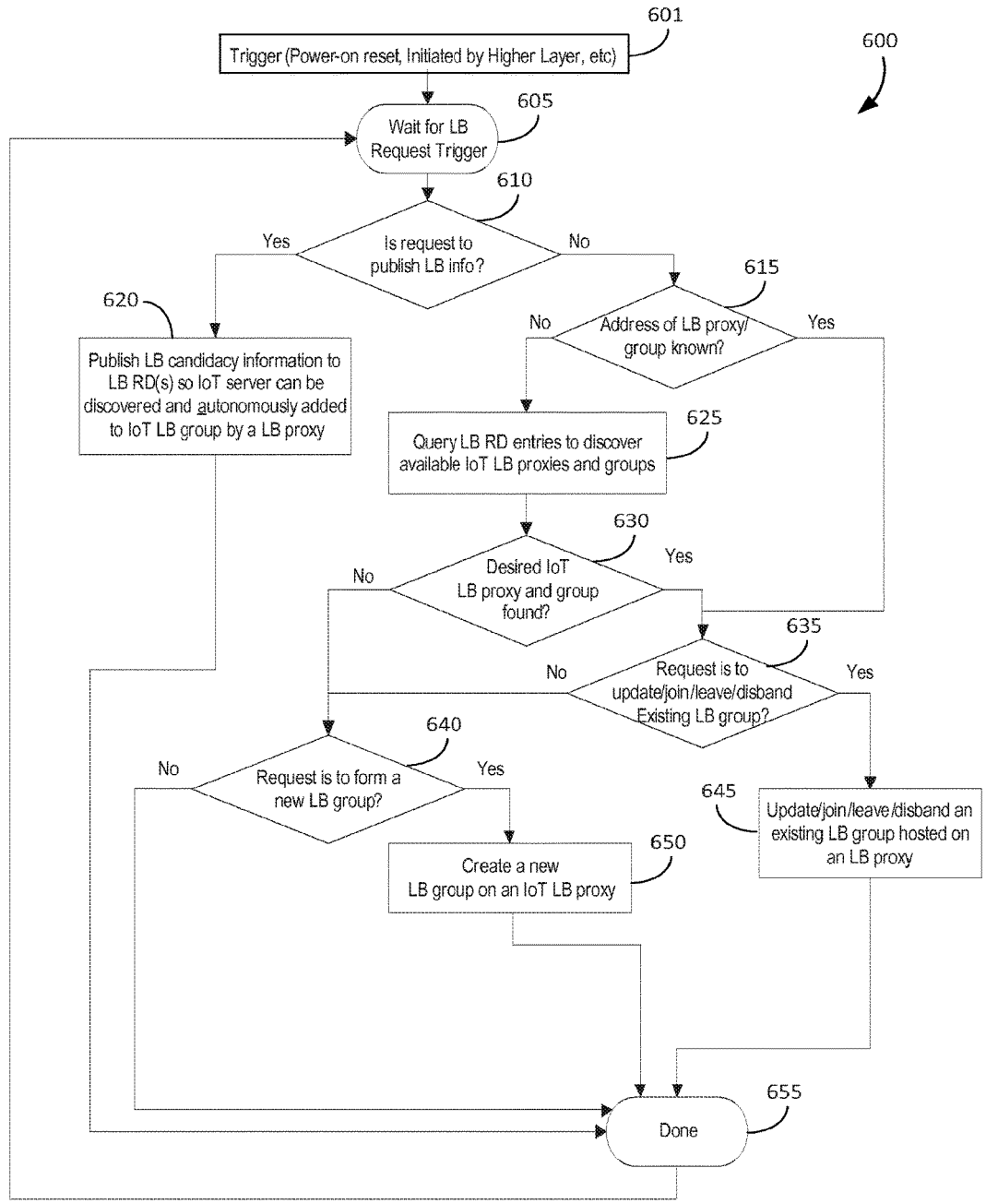
FIG. 6 illustrates an exemplary method of implementing an embodiment of the instant disclosure.

FIG. 6 illustrates exemplary, non-limiting method 600 of implementing load balancing functions at an IoT device according to an embodiment. Note that any of the functions, actions, and/or steps disclosed in regard to method 600 may be performed in any order, in isolation, with a subset of the disclosed functions, actions, and steps, and in combination with any other functions, actions, and steps, whether disclosed herein or otherwise. All such embodiments are contemplated as within the scope of the present disclosure.

At block 605, an IoT device may be waiting and/or listening for a load balancing request trigger that may be received at 601. Note, an IoT device may be triggered multiple times (e.g., to join multiple LB groups such as when a device hosts multiple resources and each resource joins a different LB group). This detected trigger may a be result of the device powering on, a higher-level application triggering the device to initiate a LB request, the occurrence of an event such as the battery level of the device reaching a certain level, or any other conditions or input.

At block 610, the IoT device may determine whether the trigger is, or correspond to, a request to publish LB information. If so, at 620 the LB information may be published. This may include publishing LB candidacy information to an RD so that the device can be discovered and automatically added to an IoT LB group by an LB proxy. In this instance, this iteration of method 600 is complete at block 655 and the device may return to block 605 to await a further trigger.

If, at block 610, the IoT device determines that trigger is not, or does not correspond to, a request to publish LB information, at 615 the IoT device may determine whether the address of an LB proxy or LB group is known. If not, at 625 the IoT device may query an LB RD to discover available LB proxies and/or groups. At 630, the IoT device may determine whether a desired IoT LB proxy and/or group is found. Whether a group is desired may be based on the types of the group and the IoT device. An IoT LB group may have a "type" associated with it, such as temperature, pressure, humidity, etc. Similarly, an IoT device may have a corresponding type (may be more than one) associated with each of its resources. Based on this information, the IoT device may determine whether a LB group is of interest to it and whether it wants to join that group. Other traits or characteristics of groups and devices may also be used to determine the desirability of a group, such as location, schedule, etc.

If so, at 635 the IoT device may determine whether the request is a request to update, join, leave, or disband the discovered LB group. If so, at block 645 the update, join, leave, or disband action is taken by the IoT device and the method, at block 655, returns to block 605 to await a further trigger.

If the request is not a request to update, join, leave, or disband the discovered LB group, or if no desired LB proxy and/or group was found at 630, then at 640 a determination is made as to whether the request is form a new LB group. If not, this iteration of method 600 is complete at 655 and it returns to block 605 to await another trigger. If so, at 650, the new group may be created on an IoT LB proxy, and then this iteration of method 600 is complete at 655 and it returns to block 605 to await another trigger.

Figure 7:
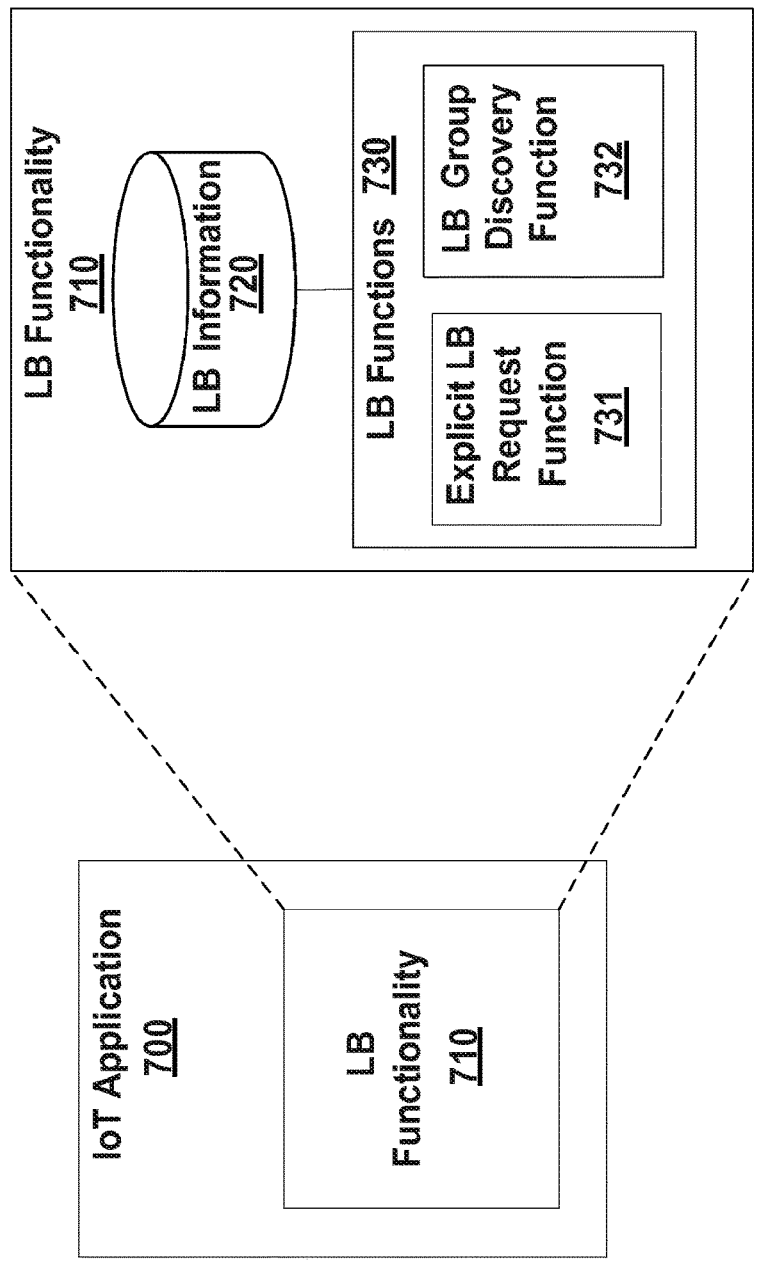
FIG. 7 illustrates an exemplary application configuration according to an embodiment.

FIG. 7 illustrates exemplary IoT application 700 that may include LB functionality 710. LB functionality 710 may include LB information 720 that may include LB policies that IoT application 700 may use to configure an IoT LB proxy. LB information 720 may also, or instead include IoT LB group information that IoT application 700 has discovered from an IoT LB RD. LB information 720 may include any other information that may be used in establishing or operating LB functions and parameters.

LB functionality may also include LB functions 730 that may include any number and variety of LB functions. For instance, LB functions 730 may include LB group discovery function 732 that may be a discovery function that may issue discovery requests and find available LB groups (if any) that are active in IoT application 700's network domain and information pertaining to such groups (e.g., group type, address, policies, etc.). This function may perform discovery by querying an IoT LB RD and/or proxy. Such a query issued by LB group discovery function 732 may specify one or more particular types of LB groups or may be a query for all available groups. Upon receiving a discovery response from an IoT LB RD and/or proxy, IoT application 700's may parse the results to determine available LB groups of interest.

LB functions 730 may also include explicit LB request function 731 that may enable IoT application 700 to issue requests to an IoT LB proxy. This function may be used to create or configure an IoT LB group, configure a LB policy, disband an LB group, etc.

Figure 8:
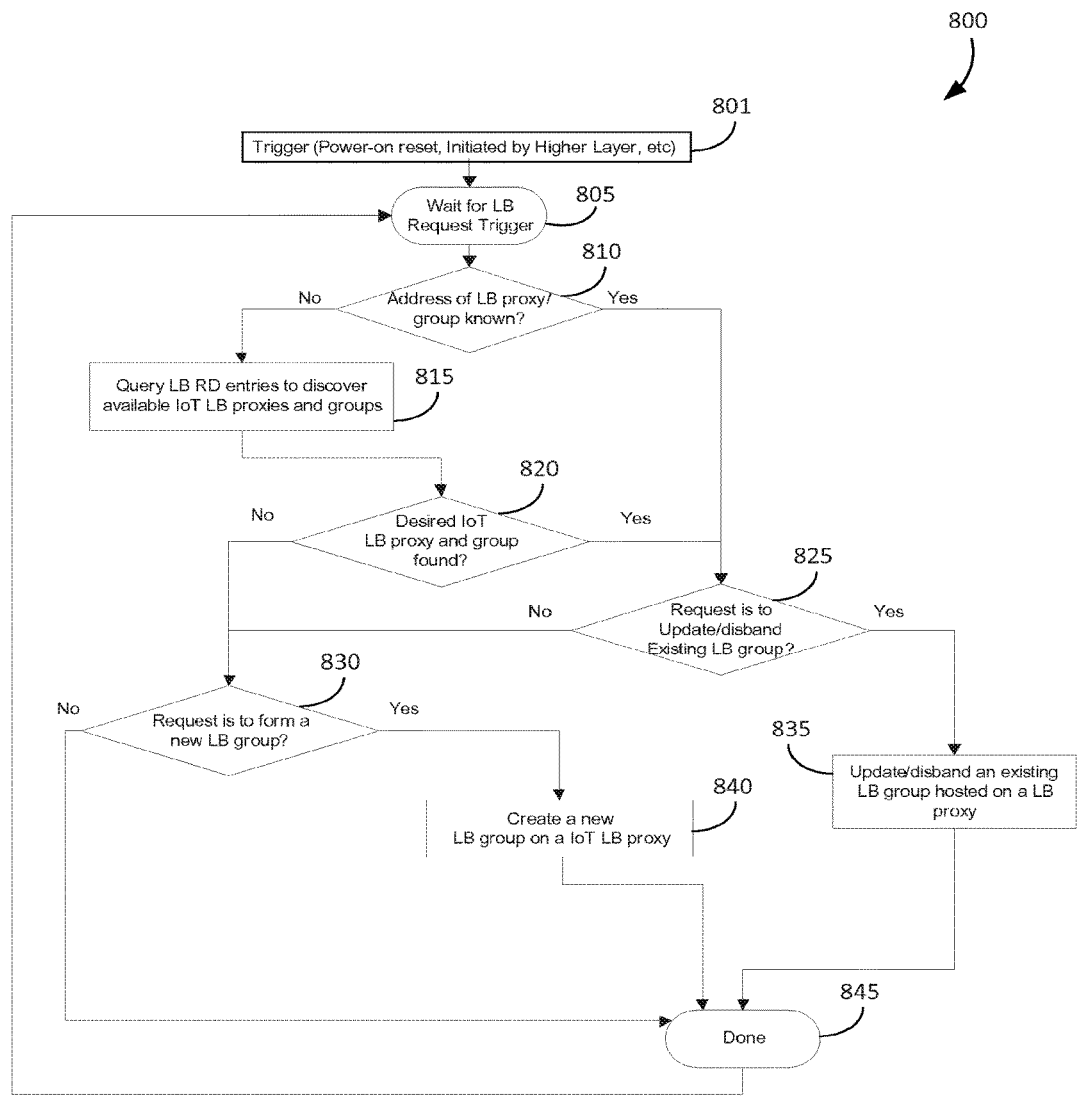
FIG. 8 illustrates an exemplary device configuration according to an embodiment.

FIG. 8 illustrates exemplary, non-limiting method 800 of implementing load balancing functions at an IoT application according to an embodiment. Note that any of the functions, actions, and/or steps disclosed in regard to method 800 may be performed in any order, in isolation, with a subset of the disclosed functions, actions, and steps, and in combination with any other functions, actions, and steps, whether disclosed herein or otherwise. All such embodiments are contemplated as within the scope of the present disclosure.

At block 805, an IoT application may be waiting or listening for a trigger. This trigger may be one or more (including all) of the application being invoked, a higher-level application triggering the application to initiate a LB request, the occurrence of an event such as the discovery of a LB proxy, or any other possible conditions. At block 810, the IoT application may determine whether the address of an LB proxy and/or group is known. If not, at block 815 the IoT application may query an LB RD to determine any available IoT LB proxies and/or groups. At block 820, it may be determined whether a desired IoT LB proxy or group was found among the proxies and/or groups discovered at block 815. As with IoT devices, as noted above in regard to FIG. 6, desirability may be based on matching or similar types of other characteristics of an application and a group.

If a desired IoT LB proxy or group was found, at block 825 a determination may be made as to whether the request is to update or disband the exiting LB group. If not, or, if at block 820 it is determined that no desired IoT LB proxy or group was found among the proxies and/or groups discovered at block 815, a block 830 it may be determined whether the request is to form a new LB group. If so, at block 840 the IoT application may create the new LB group on an IoT LB proxy and then this iteration of method 800 is complete at 845 and it returns to block 805 to await another trigger. If the request is not a request to form a new LB group, this iteration of method 800 is complete at 845 and it returns to block 805 to await another trigger.

Returning to block 825, if the request is to update or disband an existing LB group, at block 835 the IoT application may update or disband the group on an IoT LB proxy. This iteration of method 800 may then be complete at 845 and may return to block 805 to await another trigger.

Figure 9:
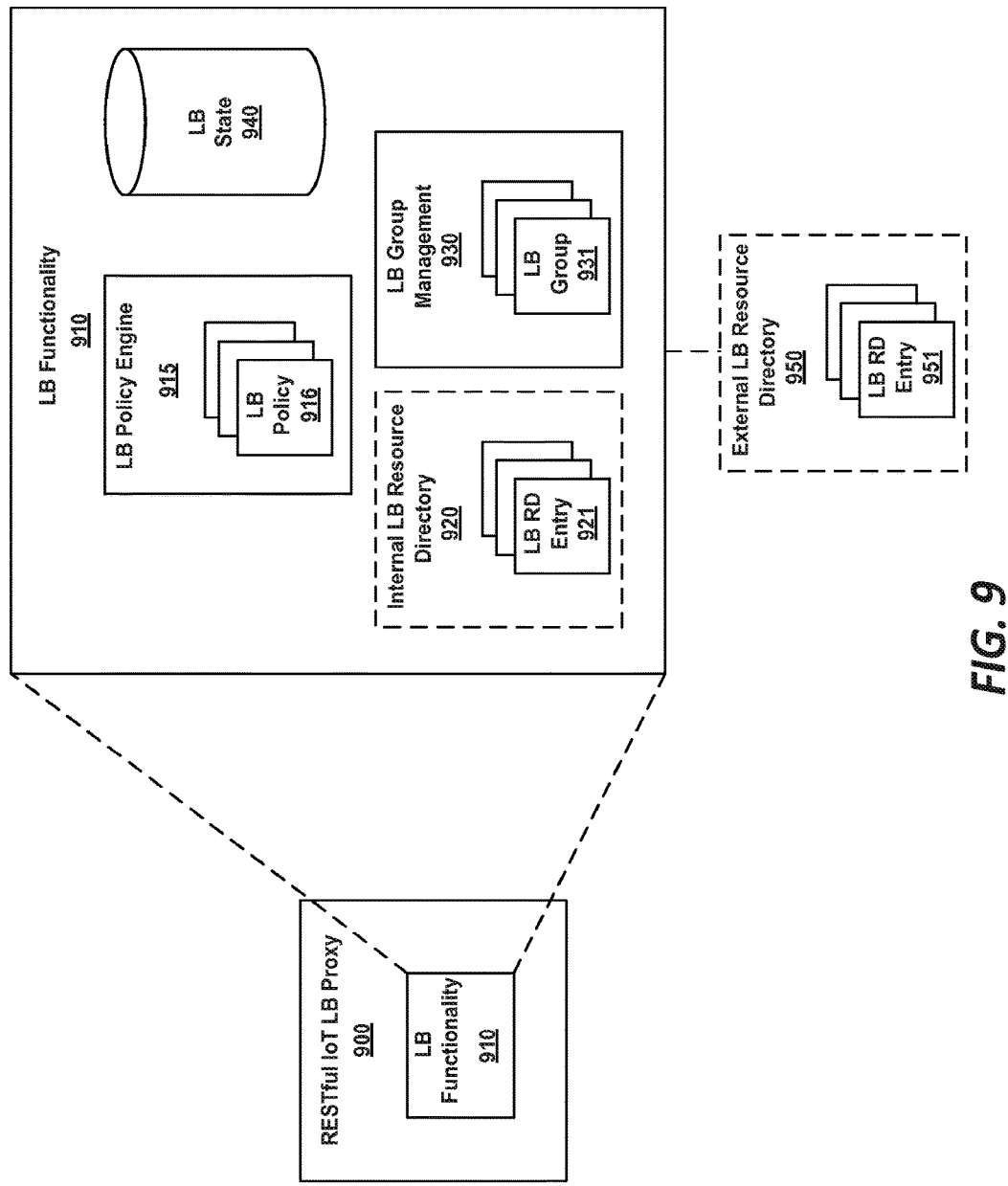
FIG. 9 illustrates an exemplary proxy configuration according to an embodiment.

FIG. 9 illustrates exemplary RESTful IoT LB proxy architecture 900 that may include LB functionality 910. An IoT LB proxy implemented using architecture 900 may service one or more of several different types of incoming RESTful requests, including IoT device requests to form, join, leave, or disband an LB group (as described in more detail herein), IoT device or application requests to create, retrieve, update, or delete an LB policy associated with a particular LB group (as described in more detail herein), IoT device or application requests for retrieving or updating a resource hosted on LB group member (i.e., an IoT device), and IoT device or application create, retrieve, update, or delete requests that target an internal LB RD (e.g., for deployments where the RD is integrated within the IoT LB proxy).

An IoT LB proxy implemented using architecture 900 may service one or more of several different types of outgoing RESTful requests as well, such as requests for forwarding IoT application requests to one or more LB group members (i.e., IoT device resources) and requests for publishing or discovering information to/from an external RD. Requests for publishing or discovering information to/from an external RD may include one or both of requests to discover IoT devices that have indicated that they are candidates for being added to a particular instance or type of LB group by a LB proxy and requests to publish information regarding active LB groups hosted by the LB proxy (e.g., address, type, policy, etc.).

An IoT LB proxy implemented using architecture 900 may include as part of LB functionality 910 LB policy engine 915 containing or otherwise configured with one or more LB policies 916. LB policy engine 915 may support publishing LB policies that are bound to a particular LB group via an LB RD entry such as LB RD entry 921 or LB RD entry 951 (described in more detail herein). In doing so, LB groups and their corresponding LB policy(ies) may be discovered and this information may be used by IoT devices to make more informed decisions on the LB groups that the IoT device should join. Alternatively, or in addition, this information may be used by IoT applications to make decisions on the LB groups that the IoT application should target.

An IoT LB proxy implemented using architecture 900 may, as part of LB functionality 910, store LB state 940 that may be used in the autonomous formation of LB groups as described in more detail below. Also as part of LB functionality 910, an IoT LB proxy implemented using architecture 900 may support LB group management 930 of LB group(s) 931 as described in more detail below.

An IoT LB proxy implemented using architecture 900 may support internal LB resource directory (RD) 920 that may include LB RD entry(ies) 921 and/or an interface to external LB RD 950 that may include LB RD entry(ies) 951. Each of these RDs may facilitate the publishing of LB information by an IoT proxy or device and the discovery of LB information by an IoT device, application, or proxy. Hence each of internal LB RD 920 and external LB RD 950 may supports publish, unpublish, and discover operations. Each of these operations may be bound to RESTful POST, DELETE, and GET methods, respectively.

An LB RD such as one or both of internal LB RD 920 and external LB RD may be used by IoT devices to publish information regarding their interests and/or requirements for LB assistance by a proxy. This information may be used by an LB proxy to discover IoT devices and their resources that may be potential candidates for LB services. For example, IoT devices may advertise that they wish to be grouped together with other IoT devices with functionalities compatible with their own if such IoT devices are available.

An LB RD such as one or both of internal LB RD 920 and external LB RD may also be used by an IoT LB proxy to publish information regarding the existence and availability of active LB groups that the proxy supports. This information may be used by IoT devices to discover available load balance groups such IoT devices may wish to join.

IoT applications may also use an LB RD such as one or both of internal LB RD 920 and external LB RD to discover the LB groups that exist and/or the LB groups that a particular IoT device or resource may be associated with. Table 1 below provides an exemplary, non-limiting list of LB related information that may be published or otherwise included within LB RD entries. Included in this table is a possible source of each type of LB information.

TABLE 1

Exemplary LB RD Entry Information

| RD Information Attribute | Abbrevation | Published by | Description |
| --- | --- | --- | --- |
| LB Candidate | lbc | IoT Device | An IoT device can specify whether or not its resources are candidates for autonomous LB supported in the network. For example, by setting this attribute to TRUE, an IoT device can express his interest in being considered for autonomous LB supported by an IoT proxy. Similarly, by setting this attribute to FALSE, an IoT device can ensure that it is not considered for autonomous LB. |

TABLE 1-continued

Exemplary LB RD Entry Information

| RD Information Attribute | Abbrevation | Published by | Description |
|---|---|---|---|
| LB Candidate Address | lbca | IoT Device | The address (e.g. URI or URL) of an IoT device resource that is a candidate for LB. This address can be non-standardized or it can be based on standardized format and conventions. For example, an IANA type registry of standardized LB URIs can be created and maintained (e.g. "coap://local_temperature_now") |
| LB Candidate Group Type | lbcgt | IoT Device | Rather than specifying a LB group instance to join, an IoT device can alternatively specify the type of group that its resources are candidates for joining. A LB proxy can then query LB RD(s) to lookup all the IoT device resources that have advertised they are candidates for joining a particular type of LB group.<br>A LB proxy can factor this information into autonomously deciding whether to group the IoT device resource into a LB group instance of a particular type (e.g. if/when there are other IoT device resources also specifying this type of LB group).<br>For example, this information can be pre-provisioned into an IoT device (i.e. IoT device) when it is manufactured or when it is deployed. In addition, an IANA type registry of standardized LB group types could also be created to enable this mechanism (e.g. Temperature, Pressure, Humidity, etc). |
| LB Characteristics | lbch | IoT Device | IoT device resources belonging to the same LB group are assumed to each have some common LB characteristic that varies in a deterministic manner. This LB characteristic can be used by a LB proxy as input to create a policy which it can then use to make LB decisions for the group (i.e. which IoT device resources to pick and forward a given incoming request to).<br>Some LB characteristics include the following:<br>Min Time Between Requests - Minimum time required by an IoT device resource to process a request (inter-request time).<br>Number of Parallel Requests - Number of parallel requests that IoT device resource can support<br>Sleep State Information - Information regarding the sleep attributes of an IoT device (e.g. time to awake from sleep)<br>Battery Information - Information regarding the remaining battery level or life.<br>LB characteristics can be encoded in various formats (e.g. TLV, AVP, etc). Alternatively each characteristic can be implemented as its own separate RD information attribute. |
| Location | lbloc | IoT Device<br>IoT Proxy | Location information of an IoT device resource. E.g. Geo location (e.g. Philadelphia), network location (e.g. domain), indoor location (e.g. first floor), etc. A LB proxy can factor this information into its decision of which LB group it places an IoT device resource in (e.g. a LB proxy can group IoT device resources together by their locations). An IoT application can also use this information to discover IoT device resources of interest by their location. |
| LB Group Address | lbga | LB Proxy | The address (e.g. URI or URL) of an available LB group resource. |
| LB Group Type | lbgt | LB Proxy | The type of an available LB group. An IANA type registry of standardized LB group types could be created to enable this mechanism (e.g. Temperature, Pressure, Humidity, etc). |
| Available LB Group Policy | lbgp | LB Proxy | The LB policy description (e.g. round-robin, weighted round-robin, etc) or an address (e.g. URI or URL) of a LB group. |

Multiple formats may be used to store LB information in RD entries such as LB RD entry(ies) 921 and/or LB RD entry(ies) 951. An LB RD entry may supports describing LB information (such as the attributes defined in Table 1) related to a particular resource. Plain text may be used as one such format listing:

lbca, lbgt, lbch, loc.

with the abbreviations as described above in Table 1.

An example plain text format RD entry may be:

172.10.0.100/sensor/temp,TEMPERATURE, NUM_P-ARALLEL_REQ=1,PHILADELPHIA

CoRE link format may instead, or in addition, be used to store LB information in RD entries such as LB RD entry(ies) 921 and/or LB RD entry(ies) 951. An LB RD entry using CoRE link format to represent the same information as set forth above for the plain text format entry may be:

```
<172.10.0.100/sensor/temp>;
lbgt="TEMPERATURE",lbch="NUM_PARALLEL_REQ
=1",lbloc="PHILADELPHIA"
``` with the abbreviations again described above in Table 1.

In yet another alternative embodiment that may be implemented instead of, or in addition to, one or both of plain text format and CoRE link format, LB information in RD entries such as LB RD entry(ies) 921 and/or LB RD entry(ies) 951 may be stored using eXtensible Markup Language (XML) format. An LB RD entry using XML format to represent the same information as set forth above for the entries in the other disclosed formats may be represented as:

```
<?xml version="1.0" encoding="UTF-8" ?>
    <entry>
        <lbca>172.10.0.100/sensor/temp</lbca>
        <lbgt>TEMPERATURE</lbgt>
        <lbch>NUM_PARALLEL_REQ=1</lbch>
        <lbloc>PHILADELPHIA</lbloc>
    </entry>
``` with the abbreviations again described above in Table 1.

In still another alternative embodiment that may be implemented instead of, or in addition to, one or both of plain text format, CoRE link format, and XML format, LB information in RD entries such as LB RD entry(ies) 921 and/or LB RD entry(ies) 951 may be stored using JavaScript Object Notation (JSON) format. An LB RD entry using JSON format to represent the same information as set forth above for the entries in the other disclosed formats may be represented as:

```
{
    "lbca": "172.10.0.100/sensor/temp",
    "lbgt": "TEMPERATURE",
    "lbch": "NUM_PARALLEL_REQ=1",
    "lbloc": "PHILADELPHIA"
}
``` with the abbreviations again described above in Table 1.

In an embodiment, IoT devices and LB proxies may publish and/or unpublish LB RD entries in an LB RD such as internal LB RD 920 and external LB RD. This publishing/unpublishing may be performed by creating/deleting LB RD entries. These entries may contain LB information such as the information in Table 1 above.

Figure 10:
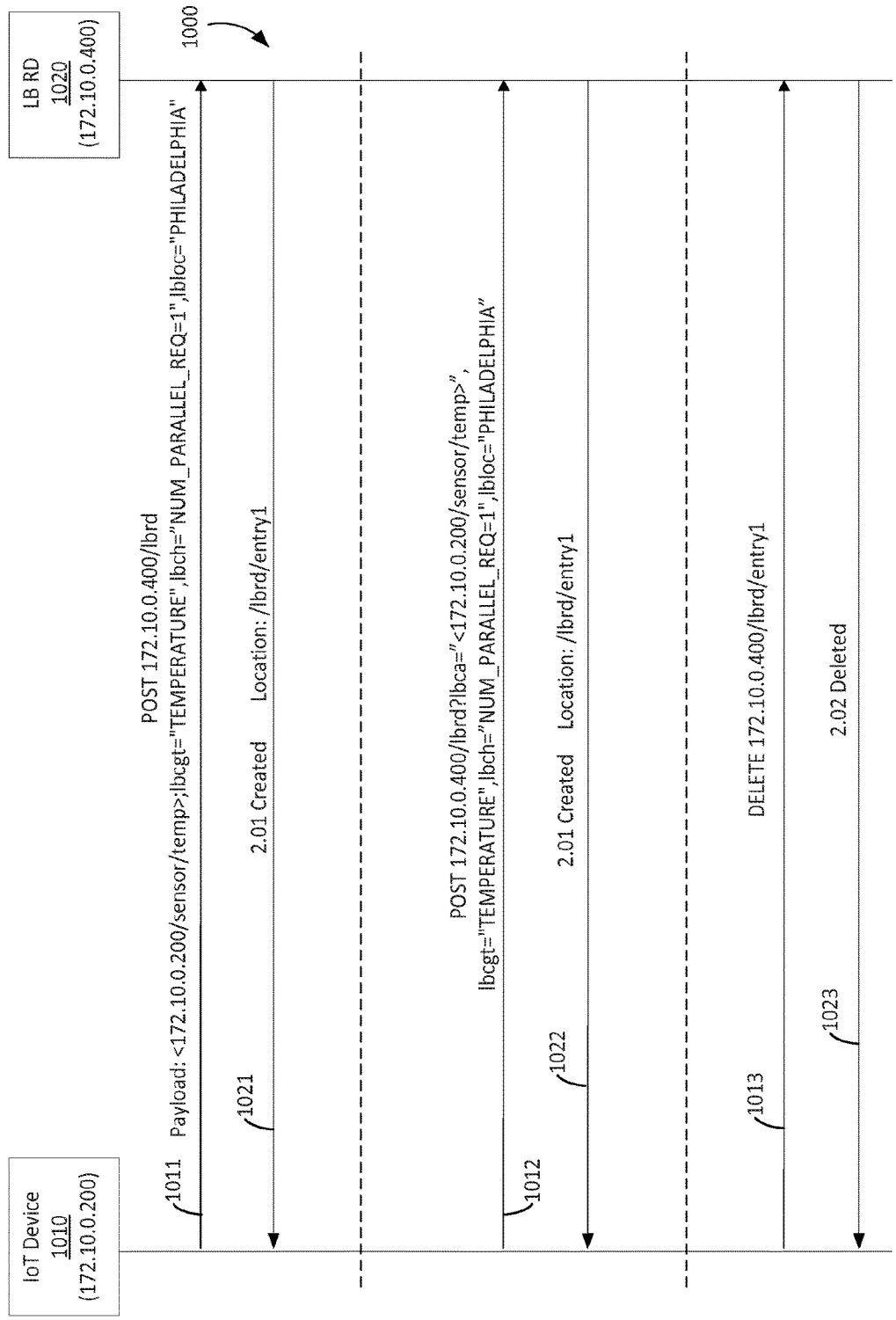
FIG. 10 illustrates a signal flow demonstrating an exemplary process performed according to an embodiment.

To publish a LB RD entry in a RESTful manner a POST request can be sent to a resource hosted on the LB RD that is designated to handle the servicing of LB RD publish requests. FIG. 10 illustrates signal flow 1000 showing signals that may be exchanged in one or more embodiments of the instant disclosure. Each of IoT device 1010 and LB RD 1020 are shown with respective IP addresses for exemplary purposes. The addresses are used in the exemplary messages shown in the figure to illustrate these disclosed embodiments.

In one embodiment, an LB entry to be published may be embedded in the payload of POST request 1011. Reply message 1021 may confirm the publication of the entry and provide the location of the entry at LB RD 1020.

In another embodiment, individual fields within an LB entry may be specified in a URI query string of POST request 1012. Reply message 1022 may confirm the publication of the entry and provide the location of the entry at LB RD 1020.

Figure 14:
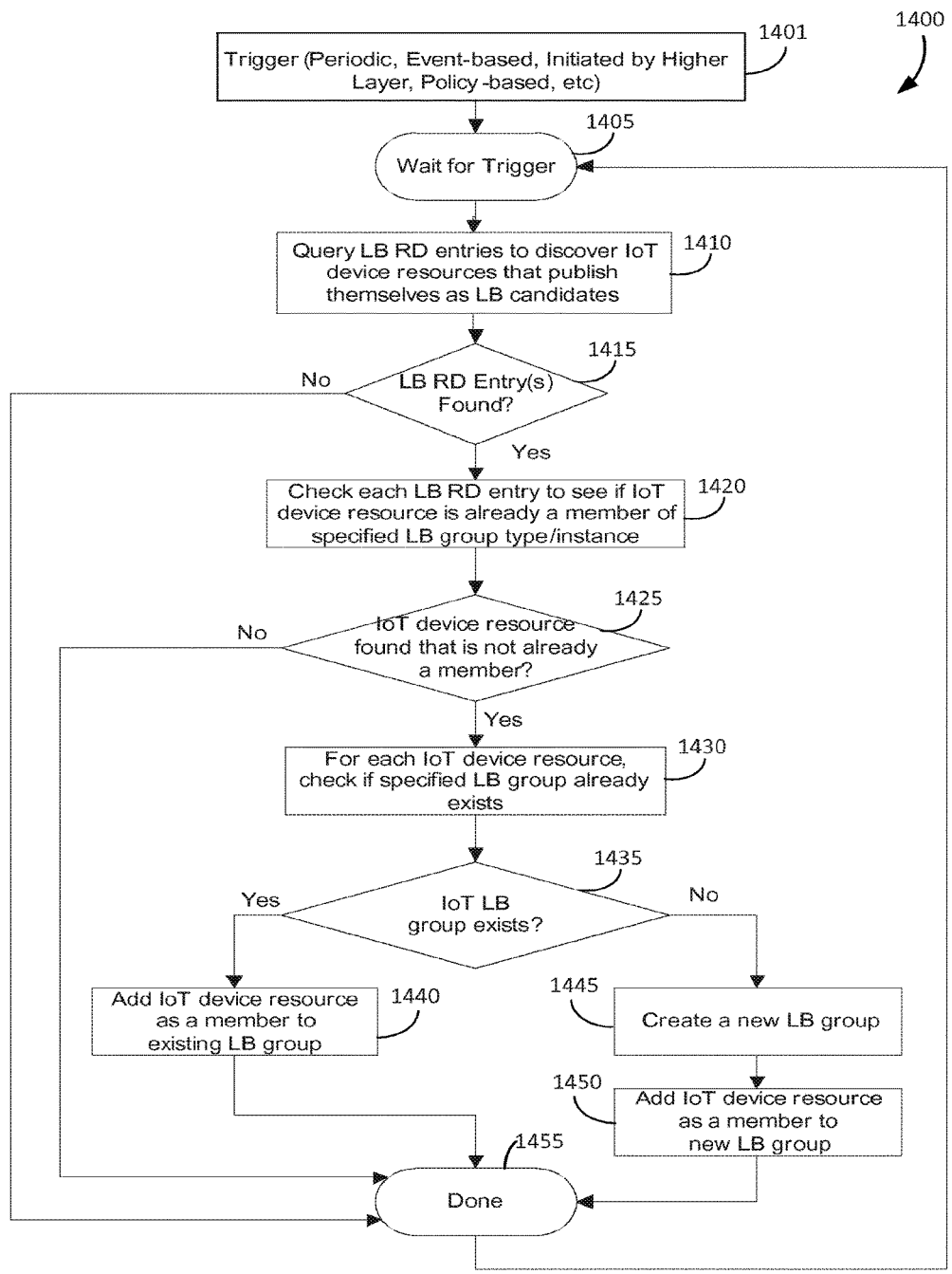
FIG. 14 illustrates an exemplary method of implementing an embodiment of the instant disclosure.

Unpublication is also illustrated in FIG. 14. DELETE message 1013 may be transmitted to LB RD 1020 from IoT device 1010 specifying the location of the entry to be deleted. Reply message 1023 may provide confirmation to IoT device 1010 that the entry was deleted.

Figure 11:
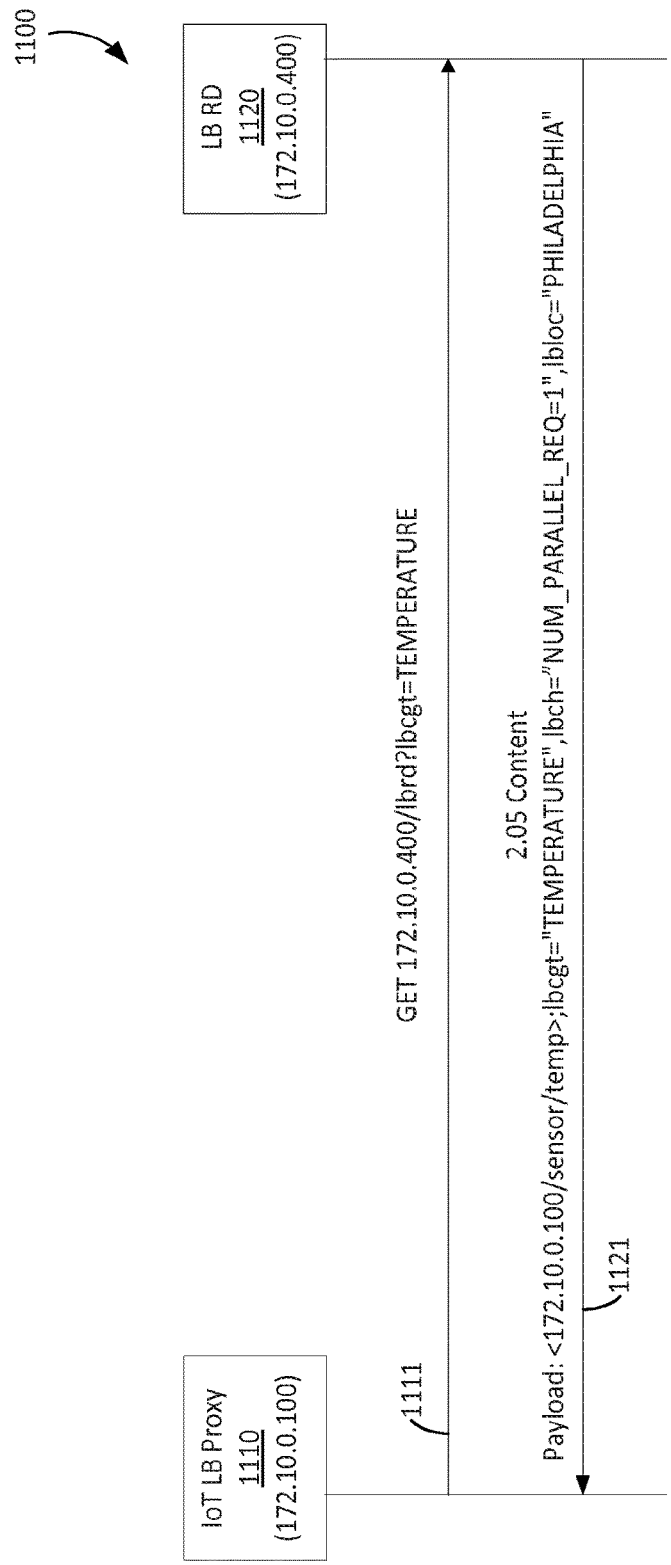
FIG. 11 illustrates a signal flow demonstrating an exemplary process performed according to an embodiment.

IoT devices, IoT applications, and IoT LB proxies may discover published LB entries by making queries to an LB RD. Such queries may contain search criteria that may be based on one or more types of LB information, including the types of information described in Table 1 (e.g., Load Balance Group Type=TEMPERATURE). FIG. 11 illustrates signal flow 1100 showing signals that may be exchanged in one or more embodiments of the instant disclosure. Each of IoT LB proxy 1110 and LB RD 1120 are shown with respective IP addresses for exemplary purposes. The addresses are used in the exemplary messages shown in the figure to illustrate these disclosed embodiments.

Discovery request sent by IoT LB proxy 1110 may be in the form of a GET request that includes search criteria specified in the URI query of the GET request (i.e., "?lbgt=TEMPERATURE"). Response 1121 may include any matching LB RD entries.

An IoT LB proxy may support requests from IoT devices to form, join, leave, or disband an LB group. Alternatively, or in addition, an IoT LB proxy may autonomously form or disband an LB group as well as autonomously add and/or remove IoT devices to and from an LB group on their behalf. In one embodiment, IP multicast may provide the mechanisms for message distribution and group formation at the IP layer, but, in some of such embodiments, may not be used for performing the type of selective load balancing group functionality described in this disclosure.

Figure 12:
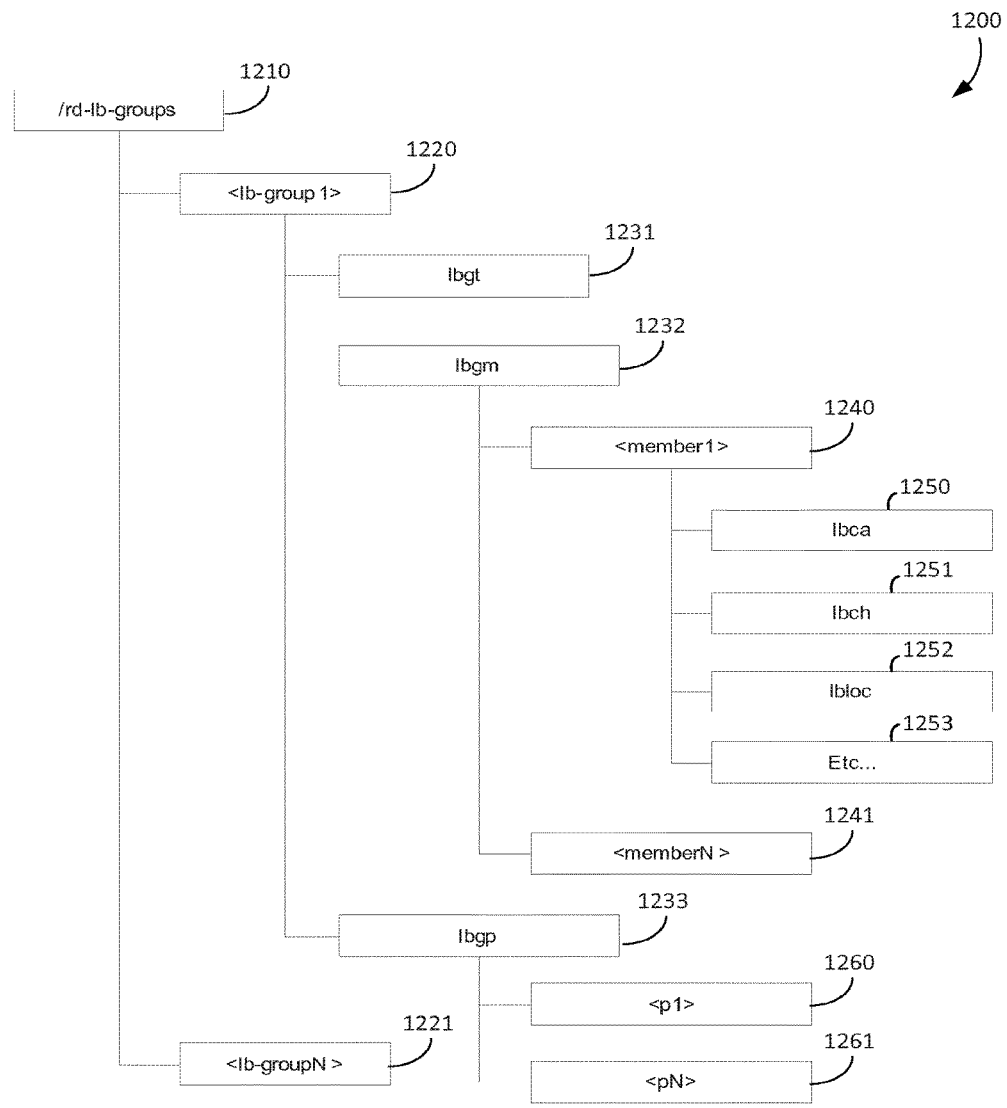
FIG. 12 illustrates an exemplary resource tree structure.

To form a new IoT LB group, an LB group resource may be created on an LB proxy or on an external RD to which an LB proxy may interface. FIG. 12 illustrates an exemplary, non-limiting embodiment of LB group resource structure 1200 that may be used to represent an LB group. Multiple LB groups 1220 and 1221 may be co-located under collection resource 1210 (e.g., "/rd-lb-groups" as shown in FIG. 12). An LB group resource may have its own unique identifier, such as a URI or a uniform resource locator (URL), that may be used to discover and address an LB group such as group 1220 (e.g., "/rd-lb-groups/lb-group1"). An LB group resource, such as LB group resource 1220, may support sub-resources that may contain LB information for the group, such as sub-resources 1231, 1232, and 1233 (see Table 1 above for details on such LB information). LB group resource 1220, under the LB group sub-resources, may also support LB information for group members, such as sub-resources 1250, 1251, 1252, and 1253 for member 1240 (see Table 2 below for details on such LB information). In some embodiments, each of the LB sub-resources may be individually addressable.

In an alternative embodiment, rather than storing LB policies under individual LB groups, such policies may be stored elsewhere in a resource tree structure such as structure 1200. For example, LB policies 1260 and 1261, may be stored under load balance group policies (lbgp) sub-resource 1233 that may be located under load balancing collection resource 1210. This configuration may facilitate the sharing of such policies across multiple LB groups.

TABLE 2

Exemplary Sub-resources of an LB Group Resource

| Sub-Resource | Abbrev. | Description |
| --- | --- | --- |
| Load Balance Group Type | lbgt | The type or categorization of the LB group. For example, an IANA type registry of standardized LB group types could also be established to enable this mechanism (e.g. Temperature, Pressure, Humidity, etc). |
| Load Balance Group Members | lbgm | A collection of one or more LB group members. A LB group member can be an IoT device, a specific resource hosted on an IoT device, etc. Each member can be represented as a LB group member resource having its own set of sub-resources. These sub-resources can be used to store LB group information specific to the member. For example, a contact address (i.e. URI or URL) which the LB proxy can use to forward requests to, LB characteristics such as sleep state information of the member, the number of parallel requests the member can service at one time, minimum time required between requests, etc. |
| Load Balance Group Policies | lbgp | A collection of one or more LB policy resources. A LB policy resource contains a LB group policy description. A LB policy description can be a literal (e.g. ROUND-ROBIN, WEIGHTED ROUND-ROBIN, etc) which can be standardized, or it can be a custom/application-specific policy written in a policy language which the LB proxy's policy engine and decipher and process (e.g. based on sleep patterns of IoT devices). Alternatively, the policy resource can be configured with an address (e.g. URI) that links it a policy that is stored elsewhere in the network which the LB proxy can access and use. LB policies can be used by a proxy to determine which IoT device (within a LB group) to forward a request to. Further details on LB policies and how they can be used by a LB proxy are described elsewhere in this disclosure. |

Figure 13:
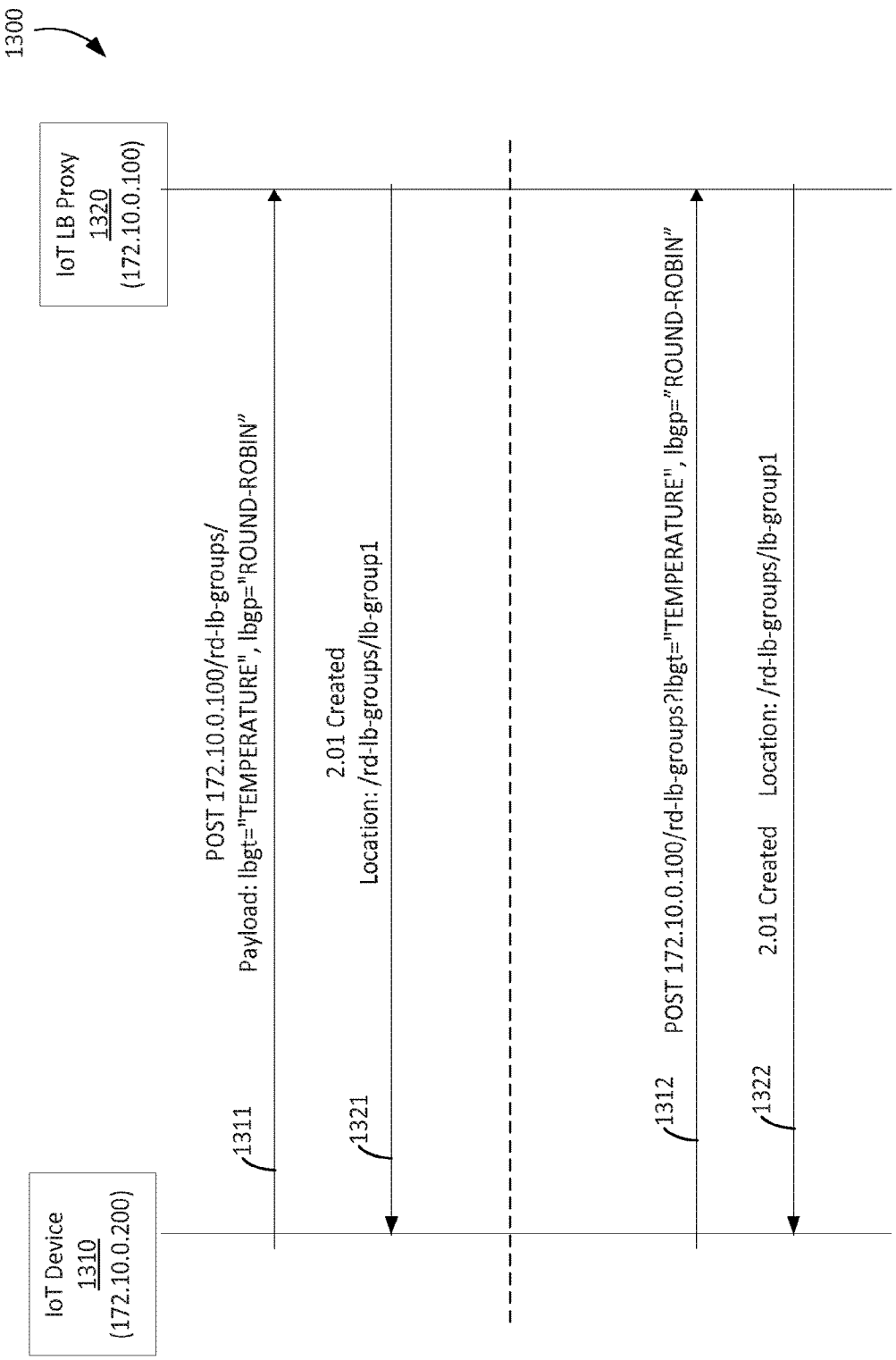
FIG. 13 illustrates a signal flow demonstrating an exemplary process performed according to an embodiment.

An illustrative IoT LB proxy may support the formation of a LB group via a request form, for example, an IoT device. This request may include LB information such as the information defined in Table 2. FIG. 13 illustrates signal flow 1300 showing signals that may be exchanged in the creation of an LB group by an IoT device according to one or more embodiments of the instant disclosure. Each of IoT device 1310 and IoT LB proxy 1320 are shown with respective IP addresses for exemplary purposes. The addresses are used in the exemplary messages shown in the figure to illustrate these disclosed embodiments.

In an embodiment, POST request 1311 may be sent from IoT device 1310 to IoT LB proxy 1320 carrying LB information in the payload. Response 1321 may be sent from IoT LB proxy 1320 to IoT device 1310 indicating the success of the creation of the LB group and an indication of the location of the group at IoT LB proxy 1320.

Alternatively, or in addition, POST request 1312 may be sent from IoT device 1310 to IoT LB proxy 1320 carrying LB information in the URI query string. Response 1322 may be sent from IoT LB proxy 1320 to IoT device 1310 indicating the success of the creation of the LB group and an indication of the location of the group at IoT LB proxy 1320.

In another embodiment, an IoT LB proxy may support the autonomous formation of an LB group. FIG. 14 illustrates exemplary, non-limiting method 1400 of implementing the autonomous formation of an LB group according to an embodiment. Note that any of the functions, actions, and/or steps disclosed in regard to method 1400 may be performed in any order, in isolation, with a subset of the disclosed functions, actions, and steps, and in combination with any other functions, actions, and steps, whether disclosed herein or otherwise. All such embodiments are contemplated as within the scope of the present disclosure.

At block 1405, an IoT LB proxy may be waiting and/or listening for a load balancing group formation request trigger that may be transmitted at 1401. Note, an IoT LB proxy may be triggered multiple times (e.g., to form multiple LB groups) to create multiple load balancing groups. The detected trigger may a be result of a higher-level application triggering the proxy to initiate a load balancing group formation, the occurrence of an event, periodic group formation triggers, triggers based on policies, or any other conditions or input.

At block 1410, the IoT LB proxy may query an LB RD to determine the IoT device resource that have published themselves as LB candidates. At block 1415, a determination may be made as to whether any such candidates have been found. If not, this iteration of method 1400 is complete at block 1455 and the IoT LB proxy may return to block 1405 to await a further trigger.

If there are IoT device resources found that have published themselves as LB candidates, at block 1420, each associated entry may be checked to determine whether the respective IoT device resource is already a member of an LB group type and/or instance that may be specified in an LB RD entry for the particular device. Such entries may specify the LB group(s) a device is already a member of and/or the LB group(s) it would like to join. At block 1425, a determination is made as to whether any IoT device resource has been found that is not already a member of a particular group. If no resource is found that is not already a member of a particular group, this iteration of method 1400 is complete at block 1455 and the IoT LB proxy may return to block 1405 to await a further trigger.

If an IoT device resource has been found that is not already a member of a particular group, at block 1430 each such resource is checked to determine if the LB group specified already exists. If it is determined at block 1435 that the IoT LB group does exist, than at block 1440, the IoT device resources found that are not members of that group may be added to that group. Otherwise, if the specified IoT LB group does not exist, at block 1445 a new group may be created and the IoT device resources found that are not members of that group may be added to the new group. Regardless of whether a new group needs to be created, at block 1455 this iteration of method 1400 is complete and the IoT LB proxy may return to block 1405 to await a further trigger.

Figure 15:
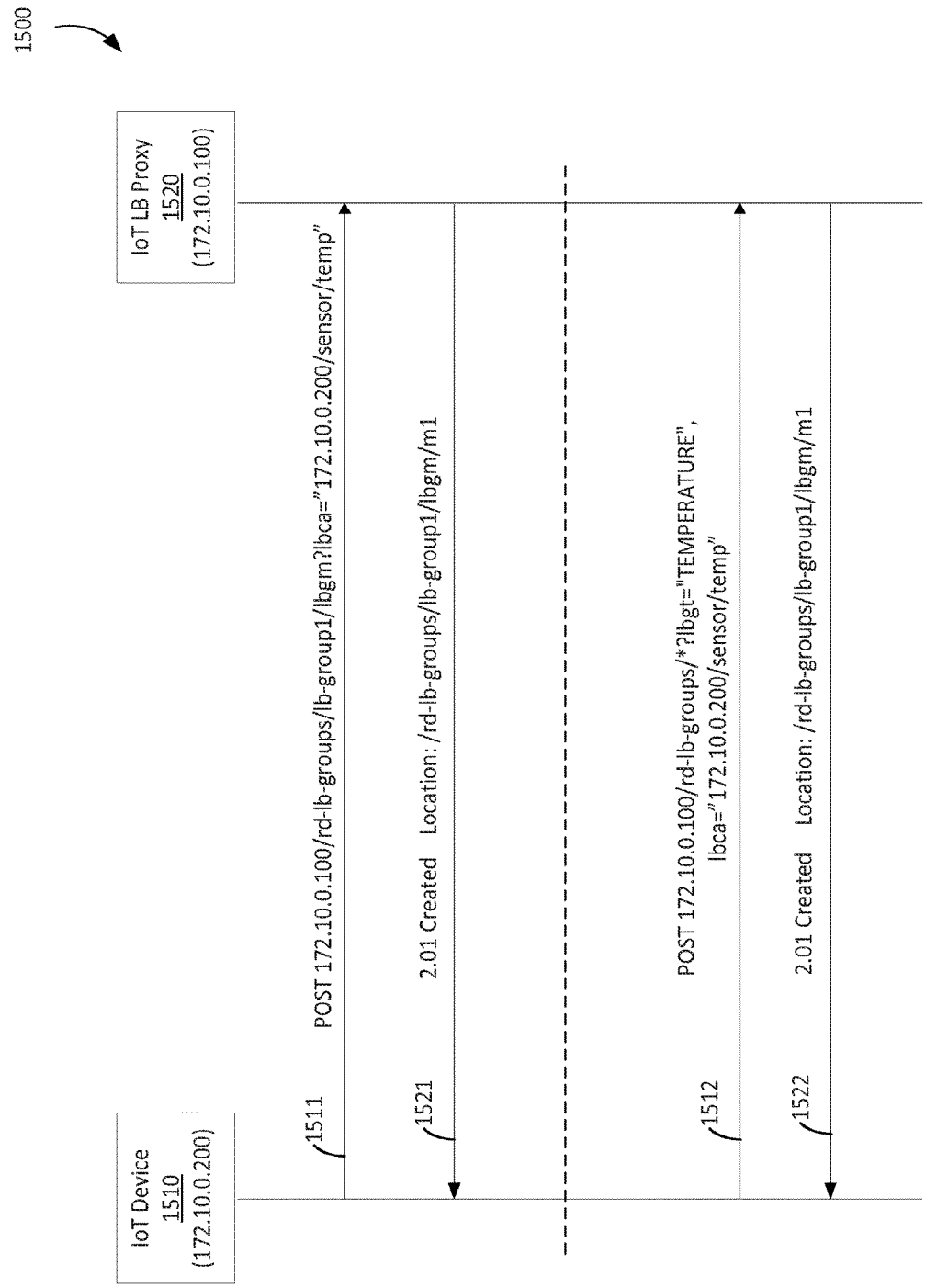
FIG. 15 illustrates a signal flow demonstrating an exemplary process performed according to an embodiment.

To join an existing IoT LB group, an IoT device may issue a request to an IoT LB proxy that specifies the targeted group instance it wishes to join or alternatively the type of group it wishes to join. FIG. 15 illustrates signal flow 1500 showing signals that may be exchanged in the process of joining an existing LB group by an IoT device according to one or more embodiments of the instant disclosure. Each of IoT device 1510 and IoT LB proxy 1520 are shown with respective IP addresses for exemplary purposes. The addresses are used in the exemplary messages shown in the figure to illustrate these disclosed embodiments.

IoT device 1510 (or, more specifically, a resource 1510 on an IoT device) may transmit POST message 1511 that specifies the targeted group instance it wishes to join. Upon receiving request 1511, IoT LB proxy 1520 may add IoT device resource 1510 to the targeted LB group instance that is specified in request 1511 if the group exists and send response message 1521 indicating that the joining was successful and the location of the group on IoT LB proxy 1520.

Alternatively, IoT device resource 1510 may transmit POST message 1512 that specifies a targeted type of LB group instance it wishes to join. The group type may be specified in the POST request's URI query string or, alternatively, the group type may be specified in the body of POST request 1512. Note that some URI query string embodiments make use of one or more wildcard (e.g., '*') characters in the URI to distinguish join request 1512 from a request to form a new load balancing group. Upon receiving request 1512, IoT LB proxy 1520 may add IoT device resource 1510 to a group of the type that is specified in request 1512 if such a group type exists and send response message 1522 indicating that the joining was successful and the location of the group on IoT LB proxy 1520.

If a LB group specified by IoT device 1510 does not exist, or if a group of the type specified by IoT device 1510 does not exist, LB proxy 1520 may form a new group (the specified group or a group of the specified type) and then may add IoT device resource 1510 to the newly created group.

Alternatively, IoT LB proxy 1520 may support autonomously adding IoT device resource 1510 to an LB group, in an embodiment as shown in FIG. 14. This autonomous adding of an IoT device resource to an LB group may be policy-based and/or may also factor in LB information discovered from an IoT LB RD and/or an LB state maintained by an IoT LB proxy. For example, for each of the existing LB groups for which it has information, an LB proxy may periodically query an LB RD to obtain a list of new candidate resources that may have been published as LB group candidates of that particular type of LB group. If any new candidate resources are detected, the LB proxy may add them to the LB group autonomously.

Figure 16:
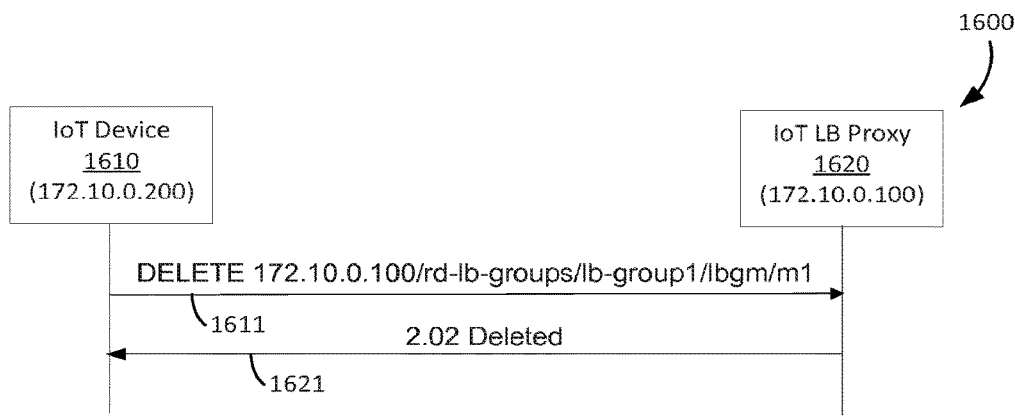
FIG. 16 illustrates a signal flow demonstrating an exemplary process performed according to an embodiment.

To leave an IoT LB group, an IoT device may issue a request to an IoT LB proxy that specifies the targeted group it wishes to leave. FIG. 16 illustrates signal flow 1600 showing signals that may be exchanged in the process of leaving an existing IoT LB group by an IoT device according to one or more embodiments of the instant disclosure. Each of IoT device 1610 and IoT LB proxy 1620 are shown with respective IP addresses for exemplary purposes. The addresses are used in the exemplary messages shown in the figure to illustrate these disclosed embodiments.

IoT device resource 1610 may send DELETE request 1611 to IoT LB proxy 1620 that specifies the targeted group it wishes to leave. DELETE request 1611 may specify an address of the LB group member resource corresponding to IoT device resource 1610. Upon receiving DELETE request 1610, LB proxy 1620 may remove IoT device resource 1610 from the specified LB group instance and reply with response 1621 indicating that IoT device resource 1610 has been removed from the specified LB group instance.

Alternatively, IoT LB proxy 1620 may support autonomously removing IoT device resource 1610 from one or more LB groups. This autonomous removal of IoT device resource 1610 from an LB group may be event-based, policy-based, and/or may be triggered by LB information discovered from an IoT LB RD and/or LB state or context information collected and maintained by IoT LB proxy 1620. For example, if an error response is repeatedly returned by IoT device resource 1610, LB proxy 1620 may determine to autonomously remove IoT device resource 1610 from an LB group of which IoT device resource 1610 is a member. Similarly, if IoT LB proxy 1620 detects that IoT device 1610 un-publishes (i.e., de-registers) a resource from an LB RD, IoT LB proxy 1620 may autonomously remove IoT device resource 1610 from the LB groups of which it is a member.

Figure 17:
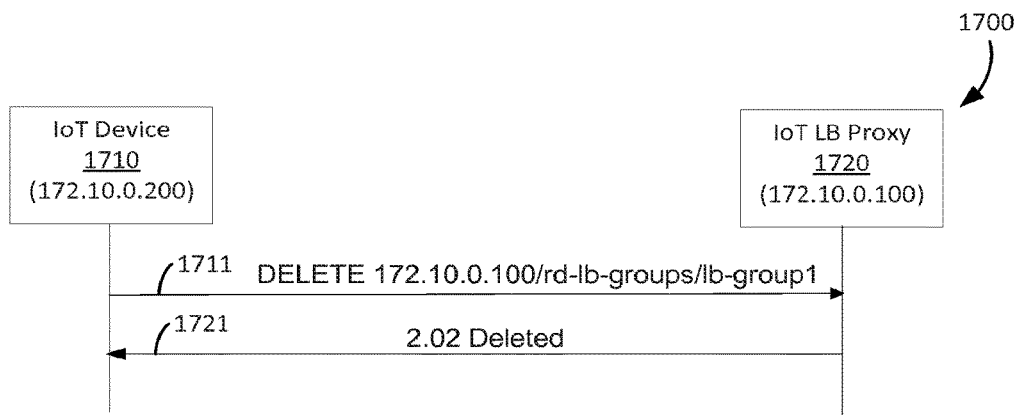
FIG. 17 illustrates a signal flow demonstrating an exemplary process performed according to an embodiment.

To disband an IoT LB group, an IoT device may issue a request to an IoT LB proxy that specifies the targeted group instance it wishes to disband. FIG. 17 illustrates signal flow 1700 showing signals that may be exchanged in the process of disbanding an existing IoT LB group according to one or more embodiments of the instant disclosure. Each of IoT device 1710 and IoT LB proxy 1720 are shown with respective IP addresses for exemplary purposes. The addresses are used in the exemplary messages shown in the figure to illustrate these disclosed embodiments.

IoT device resource 1710 may send DELETE request 1711 to IoT LB proxy 1720 that specifies the targeted group it wishes to disband. DELETE request 1711 may specify an address of the LB group that it wished to disband. Upon receiving DELETE request 1710, LB proxy 1720 may accept the request to disband the group or deny the request (e.g., if there are other active members in the group). LB proxy 1720 may reply with response 1721 indicating that has been disbanded or deleted, or indicating that the specified group has not been disbanded. In some embodiments, where LB proxy 1720 does not disband the group, response 1721 may indicate a code or other indicator of a reason why the specified group was not disbanded.

Alternatively, IoT LB proxy 1720 may autonomously disband an LB group. This autonomous disbanding may be event-based, policy-based, and/or also may factor in LB information discovered from an IoT LB RD and/or LB state or context collected and maintained by IoT LB proxy 1720. For example, if all members of an LB group leave the group, LB proxy 1720 may determine to disband the group. As part of the disbanding of an LB group, LB proxies may also un-publish the group from one or more of the LB RDs to which the group has been published.

The IoT LB proxies embodiments disclosed herein may support collecting and maintaining LB state information that they may use in LB decision making. In addition to factoring LB state information into LB decisions, the disclosed IoT LB proxies may also make LB state information accessible to other nodes in the network (e.g., other IoT LB proxies, IoT applications, IoT devices, and any other IoT entities). This may be accomplished by publishing LB state information to resources that may be locally hosted on the IoT LB proxy storing the LB state information or to resources located elsewhere in the network. An IoT LB proxy may also make LB state information discoverable by publishing information about associated resources in an LB RD.

In an embodiment, LB group state information may be information regarding the ordering and timing (i.e., scheduling) of forwarded requests to an LB group as a whole. This state information may be factored into policy-based LB decisions made by an IoT LB proxy. For example, the LB proxy may use ordering information to ensure transactions are properly distributed across the LB group members. Similarly, an LB proxy may use timing information to ensure requests are properly throttled such that IoT devices are not overloaded. In some embodiments, such throttling may be based on one or more IoT group policies.

An IoT LB proxy may also, or instead, collect and store LB context state that may be related to IoT devices and/or resources that are members of an LB group. An IoT LB proxy may collect transactional state related to a specific LB group member (e.g., from the last time the IoT LB proxy forwarded a request to the member). An IoT LB proxy may also collect context state from an LB RD to which an IoT device publishes LB information, such as sleep state, location, etc. An IoT LB proxy may also collect context state from IoT devices themselves. For example, an IoT LB proxy may collect the state of responses for requests that the IoT LB proxy has forwarded to IoT devices, such as a number of retries or a number of failed transactions as compared to a number of successful transactions. An IoT LB proxy may also collect additional LB state information from other nodes in the network, such as other LB proxies, IoT applications, routers, etc. that interact with an IoT device and/or resource.

According to the disclosed embodiments, an IoT LB proxy may support a policy engine for making policy-based LB decisions. Such a policy engine may support the binding of one or more LB policies to one or more LB groups. Such a policy engine may further support using LB policies for making LB decisions about the group members to which to forward a request. In an embodiment, binding may be performed in combination with forming an LB group, or anytime thereafter, via an update request to modify or switch an LB group policy.

The disclosed policy engine may support a library of native LB policies (e.g., round-robin, weighted round-robin, any other LB means, methods, or algorithms). In addition, the LB policy types supported by the disclosed policy engines may be standardized (e.g., a registry similar to that set up by the Internet Assigned Numbers Authority (IANA) may be established for LB policies). For example, policies labeled "ROUND-ROBIN", "LOCALITY-BASED-ROUND-ROBIN", and "WEIGHTED-ROUND-ROBIN" are a few possible types of LB policies. Where the policy is WEIGHTED-ROUND-ROBIN, the weighting used may be based on such information as battery powered vs. mains powered, battery level, available memory and/or CPU, network congestion, sleep state, schedule, etc. The disclosed policy engine may also support functionality that allows native policies to be updated and/or customized by IoT devices and applications in the network (e.g., such devices and applications may change policy weighting for weighted round-robin, etc.). The disclosed policy engine may also support functionality for creating custom LB policies to be used in addition to its native set of policies, if such native policies are configured on the policy engine (e.g., custom policy to only forward requests to IoT devices that are awake). In some embodiments, creation of new LB policies may be performed autonomously by the policy engine. Alternatively, an IoT LB proxy may support receiving requests to create new LB policies from IoT applications and devices in the network.

An LB policy engine may also support publishing LB policies that are bound to a particular LB group via a LB RD entry. By publishing such policies, LB groups and their corresponding LB policy(s) may be discovered and the discovered policy information may be used by IoT devices to make more informed decisions about LB groups to join. Such discovered policy information may also, or instead, be used by IoT applications to make decisions about IoT LB groups to target.

Figure 18:
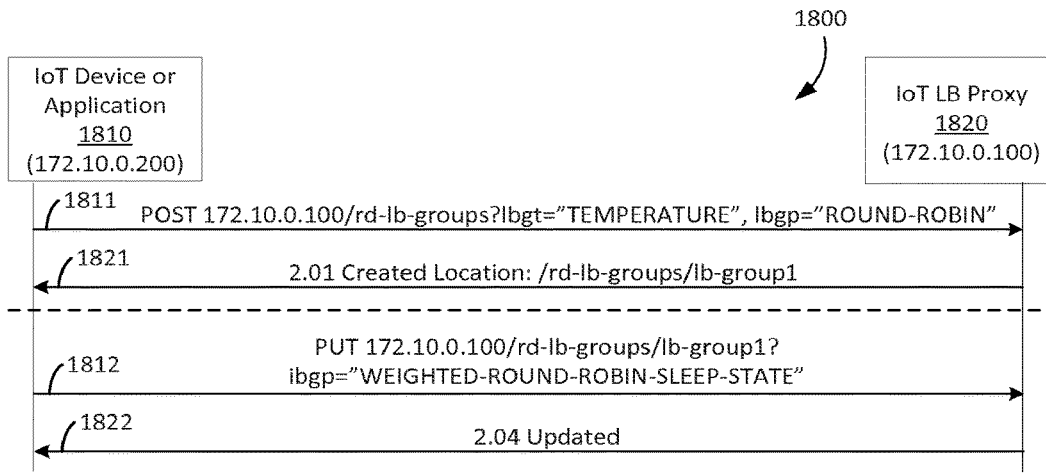
FIG. 18 illustrates a signal flow demonstrating an exemplary process performed according to an embodiment.

FIG. 18 illustrates signal flow 1800 showing signals that may be exchanged in the process of creating an LB group having an LB policy set to "ROUND-ROBIN" according to one or more embodiments of the instant disclosure. Each of IoT device or application 1810 and IoT LB proxy 1820 are shown with respective IP addresses for exemplary purposes. The addresses are used in the exemplary messages shown in the figure to illustrate these disclosed embodiments.

POST message 1811 may be sent from IoT device or application 1810 to IoT LB proxy 1820 requesting creation of an LB group that will use the policy "ROUND-ROBIN". Reply message 1821 may then be sent from IoT LB proxy 1820 to IoT device or application 1810 confirming creation of the group and providing the group's location at IoT LB proxy 1820.

PUT message 1812 may then be sent from IoT device or application 1810 to IoT LB proxy 1820 requesting updating of the LB group policy for the group created in response to message 1811. PUT message 1812 may specify that the new policy for the group should be "WEIGHTED-ROUND-ROBIN-SLEEP-STATE", which may be a policy that is standardized (e.g., by an IANA registry) or that is a native type of LB policy that is supported by the IoT LB proxy 1820. Reply message 1822 may then be sent from IoT LB proxy 1820 to IoT device or application 1810 confirming the updating of the group's policy.

When a new LB group is formed by an IoT LB proxy, the proxy may make the LB group addressable to other IoT devices, applications, and proxies by creating a resource and, in some embodiment, creating one or more sub-resources for the group as described herein. To facilitate access to the created LB group resource and sub-resources, the IoT LB proxy may assign addresses to the resource and sub-resources. A variety of addressing schemes are contemplated in the present disclosure.

Figure 19:
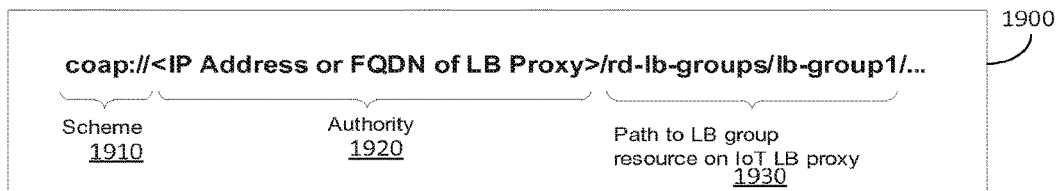
FIG. 19 illustrates an exemplary addressing format according to an embodiment.

In one embodiment, exemplary, non-limiting LB group address format 1900 of FIG. 19 may be used. LB group address format 1900 may be an absolute URI. Portion 1930 reciting "rd-lb-groups/lb-group1" may be the relative path to the LB group resource hosted on a LB proxy having an IP address or FQDN of authority 1920 reciting "<IP address or FQDN of LB proxy>". Additional levels of sub-resources may also be appended onto this address as indicated by the "..." at the end of the address. In this example, the LB proxy may support a CoAP-based interface that may service IoT application requests that target the indicated LB group resource, which is indicated by scheme 1910 reciting "coap://". Alternatively, the LB proxy may support other protocols that may be indicated in scheme 1910, such as HTTP.

An LB proxy may make the LB group address discoverable by making it accessible via one or more IoT LB RDs as described in this disclosure. IoT applications may then query an IoT LB RD having the LB group address to find that particular LB group and its corresponding address. After doing so, an IoT application may issue a unicast request targeting the LB group address. Upon receiving the request, the LB proxy may make an LB decision (e.g., using an LB policy as described herein) and select the IoT device(s) within the LB group to which to forward the request. When forwarding a request, an LB proxy may change the address of the original request to match the address of the corresponding resource on the targeted IoT device and then RESTfully unicast the request to the targeted IoT device using the same method (e.g., GET, PUT, POST, DELETE) as the original request.

In another embodiment, a registry of standardized LB group addresses (e.g., in an IANA type registry) may be formed. This registry may be used to register a set of common LB group types and corresponding relative URIs. The benefits of forming a registry for LB group addresses and types include using the registry to simplify the discovery of LB groups since queries may be done on standardized LB group names and types, using the registry to minimize duplicate LB groups that are functionally equivalent, and using the registry to increase the number of potential IoT LB group members that may increase the benefits of LB.

According to an embodiment, the CoRE link format and the CoRE RD specifications (referenced elsewhere in this disclosure) may be extended to support the IoT LB mechanisms described in this disclosure. By using CoRE formats and specifications, RESTful LB mechanisms that are well-suited for IoT networks may be implemented.

Figure 20:
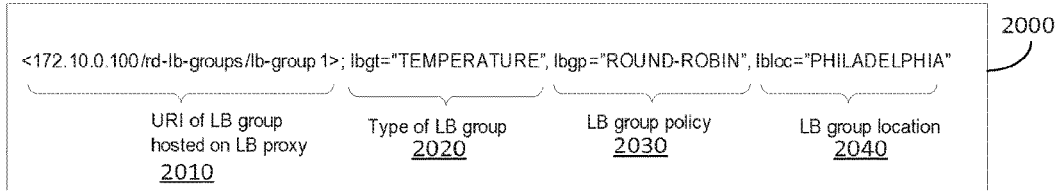
FIG. 20 illustrates an exemplary addressing format according to an embodiment.

In an embodiment, each of the LB attributes defined in Table 1 may be added as link attributes to existing CoRE link format description. In such embodiments, LB information may be added to a link description. For example, FIG. 20 illustrates link 2000 that may be used to describe an LB group that is supported by a LB proxy. Link 2000 may include URI 2010 that may be a network address of an LB group hosted on an LB proxy, indicator 2020 indicating an LB type of the LB group, indicator 2030 indicating a policy of the LB group, and indicator 2040 indicating a location (network, geographical, indoor, etc.) of the LB group. Link 2000 may be discovered by IoT devices and applications in a network. Each of these devices and applications may in turn use the LB information in the link (e.g., an IoT device may use this information to join the addressed LB group).

Figure 21:
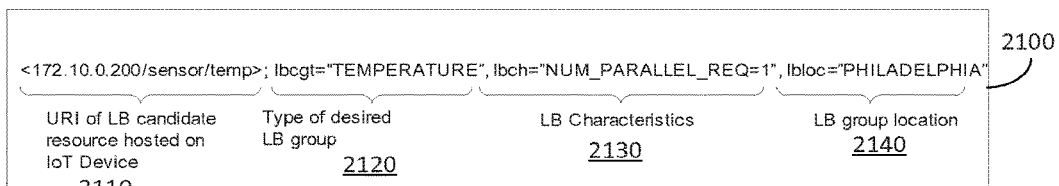
FIG. 21 illustrates an exemplary addressing format according to an embodiment.

Similarly, FIG. 21 illustrates link 2100 that may describe a resource hosted on an IoT device that the IoT device advertises as a LB candidate. Link 2100 may be discovered by IoT proxies in the network that may in turn determine whether to autonomously add the IoT device's resource to a compatible LB group based on the advertised LB attributes (e.g., compatible LB group type, LB characteristics, location of the IoT device, etc.). Link 2100 may include URI 2110 that may be a network address of the LB candidate resource hosted on an IoT device, indicator 2120 indicating an LB type of the desired LB group, indicator 2130 indicating LB characteristics, and indicator 2140 indicating a location (network, geographical, indoor, etc.) of the IoT device.

Each of links 1900, 2000, and 2100 may be made available for discovery by publishing them to a CoRE RD as described herein, or by making them available via the standardized CoRE link format discovery resource URI (i.e., "well-known/core").

In some embodiments, extensions may be added to a CoRE RD to support the disclosed LB mechanisms. For example, extensions may be added to the CoRE RD registration function to support creating a LB group. In another example, extensions may be added to the CoRE RD registration function to support expressing LB group candidacy. In yet another example, extensions may be added to the CoRE RD discovery and lookup functions to support discovering an LB group. In still yet another example, extensions may be added to the CoRE RD registration and update functions to support joining a LB group. Another embodiment may add extensions to the CoRE RD removal function to support leaving a LB group. Still another embodiment may add extensions to the CoRE RD removal function to support disbanding a LB group.

Figure 22:
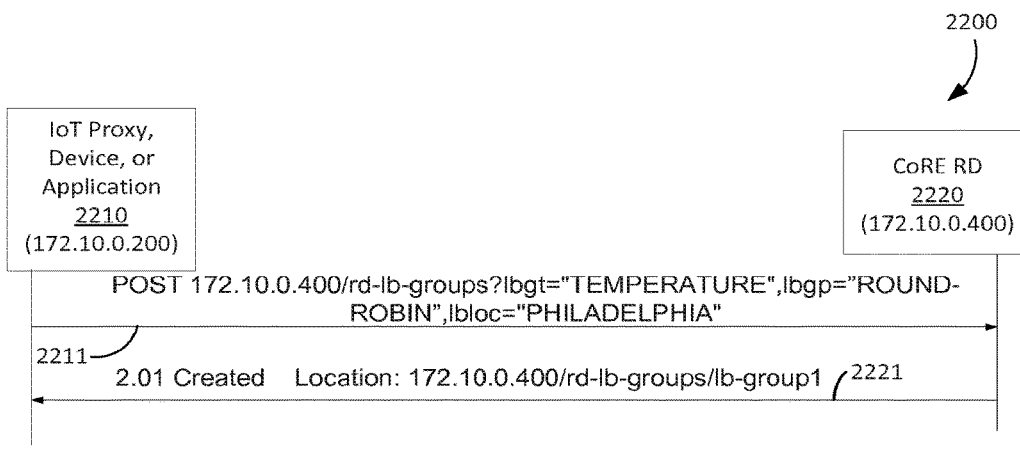
FIG. 22 illustrates a signal flow demonstrating an exemplary process performed according to an embodiment.

To support the creation of LB groups, a CoRE RD may support a new LB resource type and a corresponding LB RD location where LB groups may be created. For example, CoRE RD may support a resource type named "core.rd-lb-groups" and a corresponding RD location "/rd-lb-groups". FIG. 22 illustrates signal flow 2200 showing signals that may be exchanged in the process of creating an LB group according to one or more embodiments of the instant disclosure. Each of IoT proxy, device, or application 2210 and CoRE RD 2220 are shown with respective IP addresses for exemplary purposes. The addresses are used in the exemplary messages shown in the figure to illustrate these disclosed embodiments.

CoRE RD 2220 may support LB attributes being passed in the URI query string of POST request 2211 requesting the creation of an LB group. Examples of these attributes may be attributes such as those described in this disclosure, such as type of LB group, an LB policy associated with the group, a location of the LB group, etc. The payload of POST request 2211 may also contain the link descriptions of one or more IoT device resources to be added as members of the LB group. In some embodiments, these link descriptions may be formatted as described in regard to FIG. 21. Reply message 2221 may confirm the success of the creation of the LB group and may also indicate the location of the LB group at CoRE RD 2220.

A CoRE RD may also support mechanisms to allow an IoT device to advertise its resources as candidates for LB (i.e., to be discovered by an IoT LB proxy and autonomously added to a LB group by the IoT LB proxy). In an embodiment, LB candidacy may be expressed extensions defined at the CoRE RD registration function that enable an IoT device with the capability to include LB information with each resource it registers with a CoRE RD. For example, a CoRE RD may support the passing of LB related information within a URI query string of a registration request. This LB information may then be applied to all the resources that the IoT device is registering. LB information may also be included within individual link descriptions that may be included within the payload of a registration request. By doing so, finer granularity may be achieved (i.e., different LB information may be specified for each individual resource).

Figure 23:
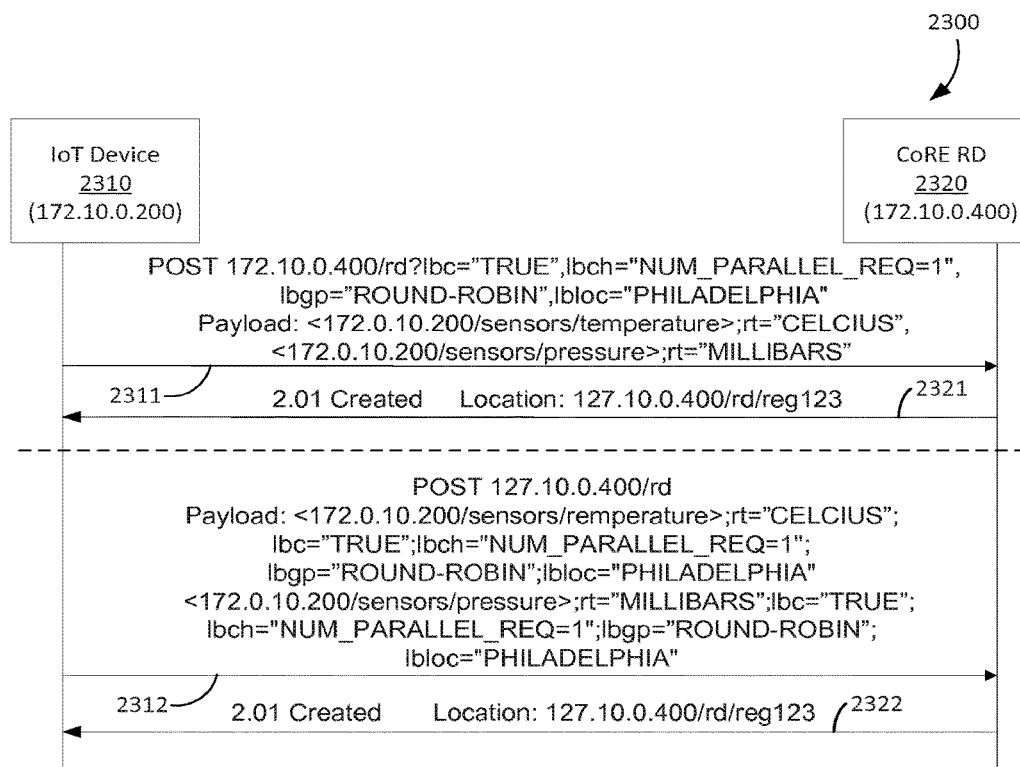
FIG. 23 illustrates a signal flow demonstrating an exemplary process performed according to an embodiment.

FIG. 23 illustrates signal flow 2300 showing signals that may be exchanged in the process of advertising resources as candidates for LB according to one or more embodiments of the instant disclosure. Each of IoT device 2310 and CoRE RD 2320 are shown with respective IP addresses for exemplary purposes. The addresses are used in the exemplary messages shown in the figure to illustrate these disclosed embodiments.

IoT device 2310 may send POST message 2311 to CoRE RD 2320 requesting registration to CoRE RD 2320 and including LB information in the URI query string. Response 2321 may be transmitted from CoRE RD 2320 to IoT device 2310 indicating the success of the registration and the location of the registration at CoRE RD 2320.

IoT device 2310 may also, or instead, send POST message 2312 to CoRE RD 2320 requesting registration to CoRE RD 2320 and including LB information in the payload and attached to an individual resource link description. Response 2322 may be transmitted from CoRE RD 2320 to IoT device 2310 indicating the success of the registration and the location of the registration at CoRE RD 2320.

Before an IoT device may join an LB group and add its resources as members, it must first discover a LB group to join. Similarly, before an IoT LB proxy may autonomously add an IoT device resource to an LB group it must first discover whether the resource is an LB candidate. If a CoRE RD supports LB functionality then it may be used to perform these types of LB discovery.

Figure 24:
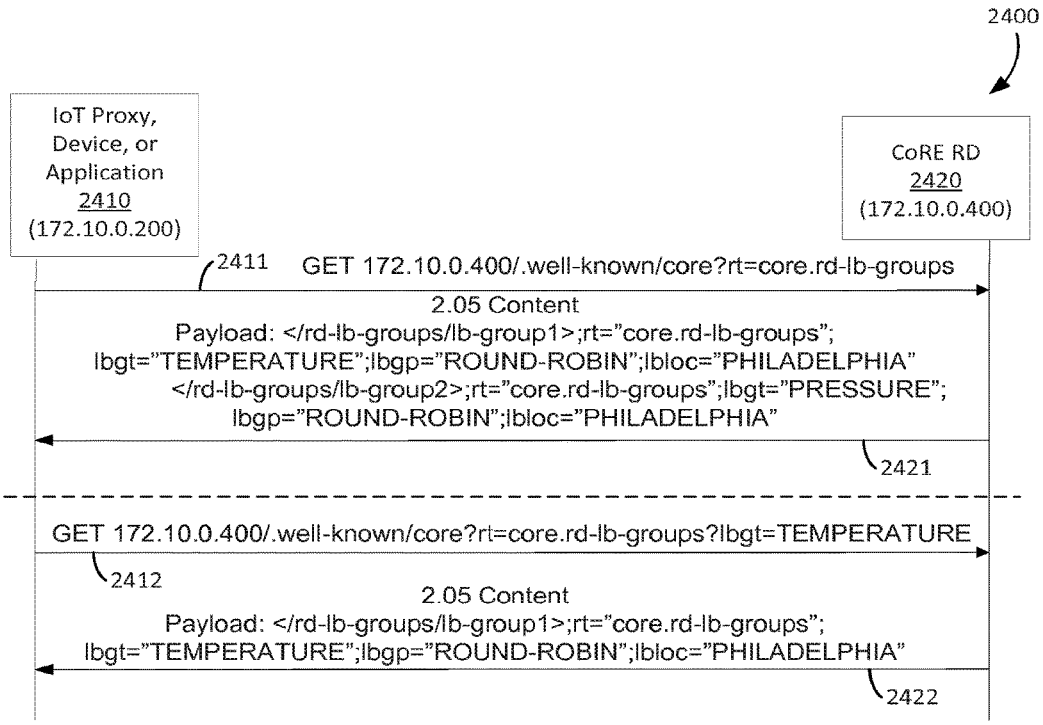
FIG. 24 illustrates a signal flow demonstrating an exemplary process performed according to an embodiment.

FIG. 24 illustrates signal flow 2400 showing signals that may be exchanged in the process of a discovery of LB groups via CoRE RD LB queries according to one or more embodiments of the instant disclosure. Each of IoT proxy, device, or application 2410 and CoRE RD 2420 are shown with respective IP addresses for exemplary purposes. The addresses are used in the exemplary messages shown in the figure to illustrate these disclosed embodiments.

To discover all existing LB groups registered to CoRE RD 2420, GET query 2411 on the "core.re-lb-group" CoRE RD resource type (rt) parameter may be sent from IoT proxy, device, or application 2410 to CoRE RD 2420. If CoRE RD 2420 does not support LB functionality it may respond with an error (e.g., "4.00 Bad Request"). If CoRE RD supports LB functionality, it may send response 2421 indicating success with a payload that contains a link for each existing LB group of which it may be aware (if any).

Similarly, to discover a particular type of LB group, GET query 2412 including an additional query string parameter to specify the LB group type (e.g., "lbgt=TEMPERATURE" in query 2412) may be sent from IoT proxy, device, or application 2410 to CoRE RD 2420. The links returned in discovery response 2422 may be formatted using a CoRE link format as disclosed herein, in some embodiments along with LB extensions as disclosed herein.

Figure 25:
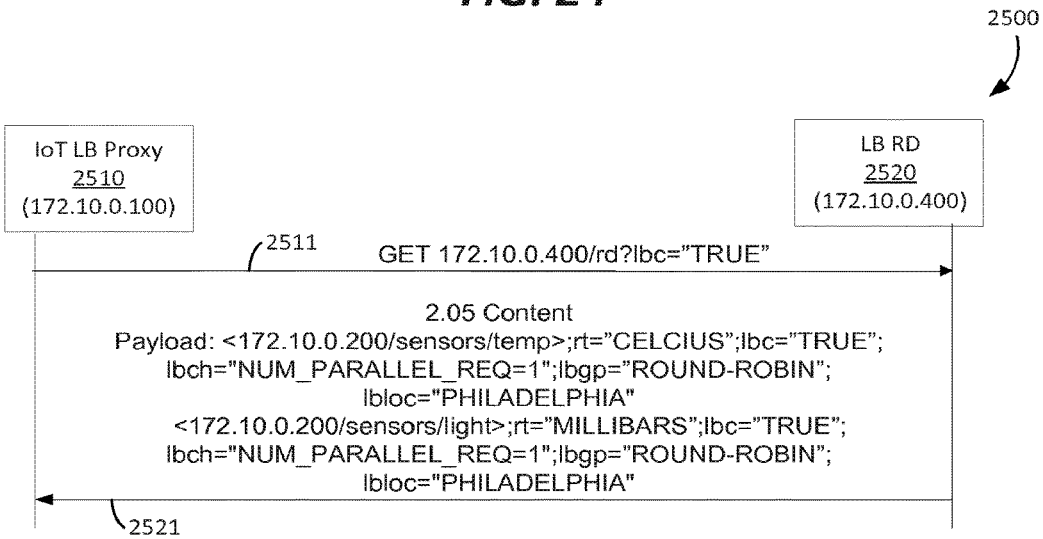
FIG. 25 illustrates a signal flow demonstrating an exemplary process performed according to an embodiment.

FIG. 25 illustrates signal flow 2500 showing signals that may be exchanged in the process of discovery of LB Candidates via CoRE RD LB queries according to one or more embodiments of the instant disclosure. Each of IoT LB proxy 2510 and LB RD 2520 are shown with respective IP addresses for exemplary purposes. The addresses are used in the exemplary messages shown in the figure to illustrate these disclosed embodiments.

To discover resources that are candidates for LB, IoT LB proxy 2510 may transmit GET query 2511 to LB RD 2520 that may be a CoRE RD LB. IoT LB proxy 2510 may query based on the LB candidate attribute ("lbc") as shown in FIG. 25. Response 2521 may be sent to IoT LB proxy 2510 from LB RD 2520 indicating the resources that are candidates for LB.

Figure 26:
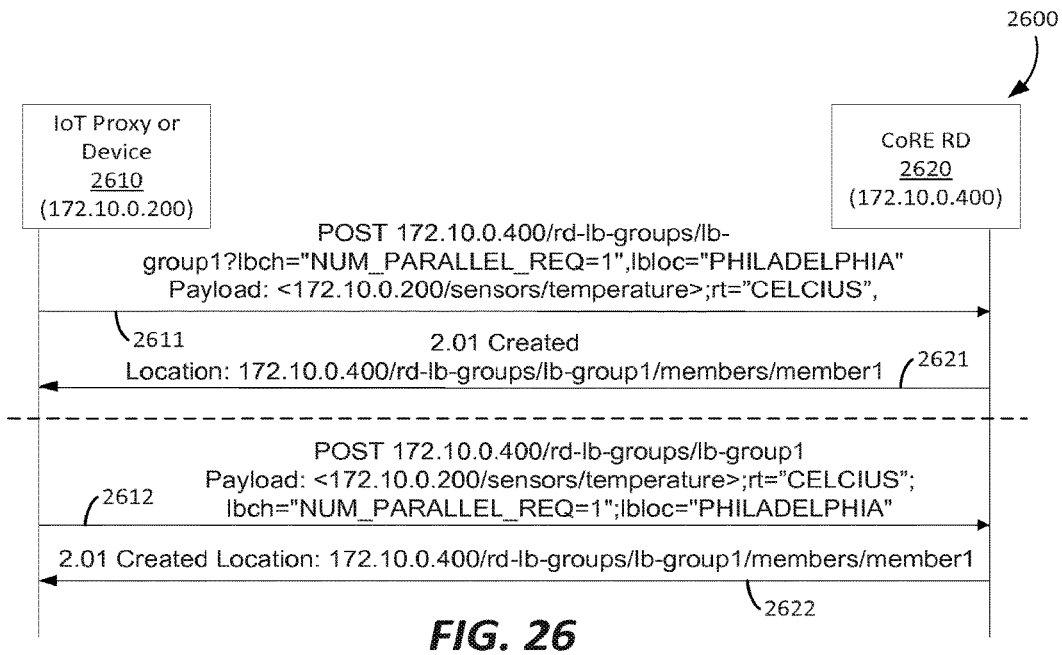
FIG. 26 illustrates a signal flow demonstrating an exemplary process performed according to an embodiment.

FIG. 26 illustrates signal flow 2600 showing signals that may be exchanged in the process of adding resources to a LB group via CoRE RD according to one or more embodiments of the instant disclosure. Each of IoT proxy or device 2610 and CoRE RD 2620 are shown with respective IP addresses for exemplary purposes. The addresses are used in the exemplary messages shown in the figure to illustrate these disclosed embodiments.

To allow IoT devices to join (i.e., create a membership) to an LB group or to allow an IoT proxy to autonomously add a resource on behalf of an IoT device as a member to a LB group, a CoRE RD may support a POST request, such as POST request 2611, to add one or more resources to an existing LB group. CoRE RD 2620 may respond with message 2621 confirming addition of the resource. Similarly, an IoT device and/or IoT LB proxy can also use this mechanism, as illustrated with POST request 2612, to update an existing membership to a LB group. For example, change the values of LB attributes such as its load balancing characteristics. CoRE RD 2620 may respond with message 2622 confirming the update of the membership.

Figure 27:
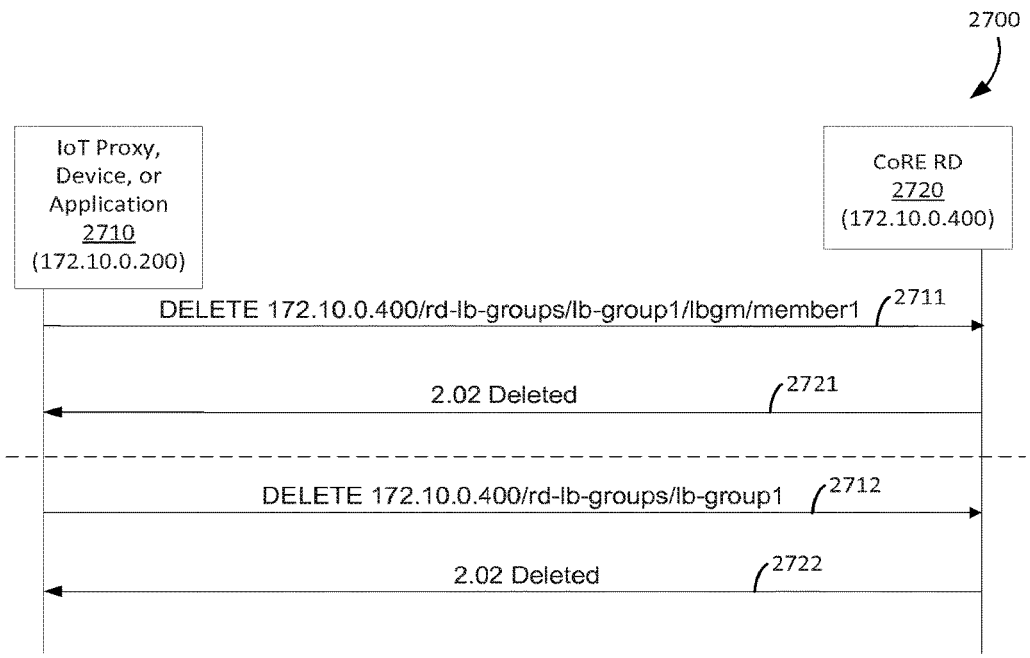
FIG. 27 illustrates a signal flow demonstrating an exemplary process performed according to an embodiment.

FIG. 27 illustrates signal flow 2700 showing signals that may be exchanged in the process of removing resources from an LB group via CoRE RD according to one or more embodiments of the instant disclosure. Each of IoT proxy, device, or application 2710 and CoRE RD 2720 are shown with respective IP addresses for exemplary purposes. The addresses are used in the exemplary messages shown in the figure to illustrate these disclosed embodiments. IoT proxy, device, or application 2710 may send DELETE request 2711 to CoRE RD 2720 requesting removal of a particular resource from an LB group. CoRE RD 2720 may response with message 2721 confirming the removal of the resource. IoT proxy, device, or application 2710 may send DELETE request 2712 to CoRE RD 2720 requesting disbanding (i.e., deletion) of an LB group. CoRE RD 2720 may response with message 2722 confirming the deletion of the LB group.

In an example of an embodiment, a large number of sensors may be monitoring the inside temperature in a large building where there have been complaints by the tenants of uncomfortable temperatures (e.g., either too hot or too cold). The sensors may all be battery powered and may spend approximately 90% of their time asleep. The other 10% of the time the sensors awake to take a temperature measurement and service any temperature read requests that may have been targeted towards them (e.g., service a GET request).

The sensors may have independent sleep cycles relative to each other (i.e. they were installed in an unsynchronized manner and attached them to various wall locations). After the sensors are installed they are powered on for the first time. At that time each sensor discovers and registers to a CoRE RD that is co-located with an LB proxy. As part of this registration, each sensor may store LB information in the CoRE RD, such as a URI of the temperature sensor resource, a candidate LB group type attribute that is configured with the value of "TEMPERATURE", an LB characteristic attribute that is configured with the sensor's sleep pattern and/or schedule information, and location information regarding the indoor location inside the building where the sensor is deployed.

After this registration, the LB proxy queries the CoRE RD and discovers several temperature sensor resources that are candidates for being added to an LB group of type "TEMPERATURE". The LB proxy then queries the CoRE RD to check whether there is an existing LB group of type "TEMPERATURE" and may determine that there isn't one. As a result, the LB proxy may create a new LB group of type "TEMPERATURE" and add each of the sensors as members to this LB group. Based on the LB characteristic attributes of each temperature sensor, the LB proxy may configures the LB policy of this group such that requests are only forwarded to temperature sensors hosted on devices that are not currently sleeping.

Using, for example, a laptop, a technician may then query the CoRE RD/LB proxy to discover the LB group of type "TEMPERATURE". Using this information, the technician may issue periodic GET requests with his laptop to the LB group URI. Each request may specify a specific location in the building in which the technician is interested in measuring the temperature (e.g., room1, room2, etc.). When the LB proxy receives a GET, it first queries the CoRE RD to obtain a list of sensors in the "TEMPERATURE" LB group that have a matching location to the one specified by the technician. The LB proxy may then check the sleep cycle pattern/schedule information of each sensor in this list to find one that is awake. It picks one of the wakeful sensors based on LB policies and forwards the GET request to that sensor. The sensor then returns the temperature in a GET response that the LB proxy returns to the technician's laptop. The process repeats as long as the technician continues to make temperature reading requests.

Note that in some embodiments, a user interface may be generated or otherwise provided to indicate load balancing status and activities to a user and to provide a user means to affect load balancing. For example, successful joining to an LB group, departure from an LB group, creation of an LB group, etc., may be indicated visually and/or aurally to a user. A user interface may also allow a user to instruct one or more devices to join, separate from, or create an LB group. All such embodiments are contemplated as within the scope of the present disclosure.

Figure 28A:
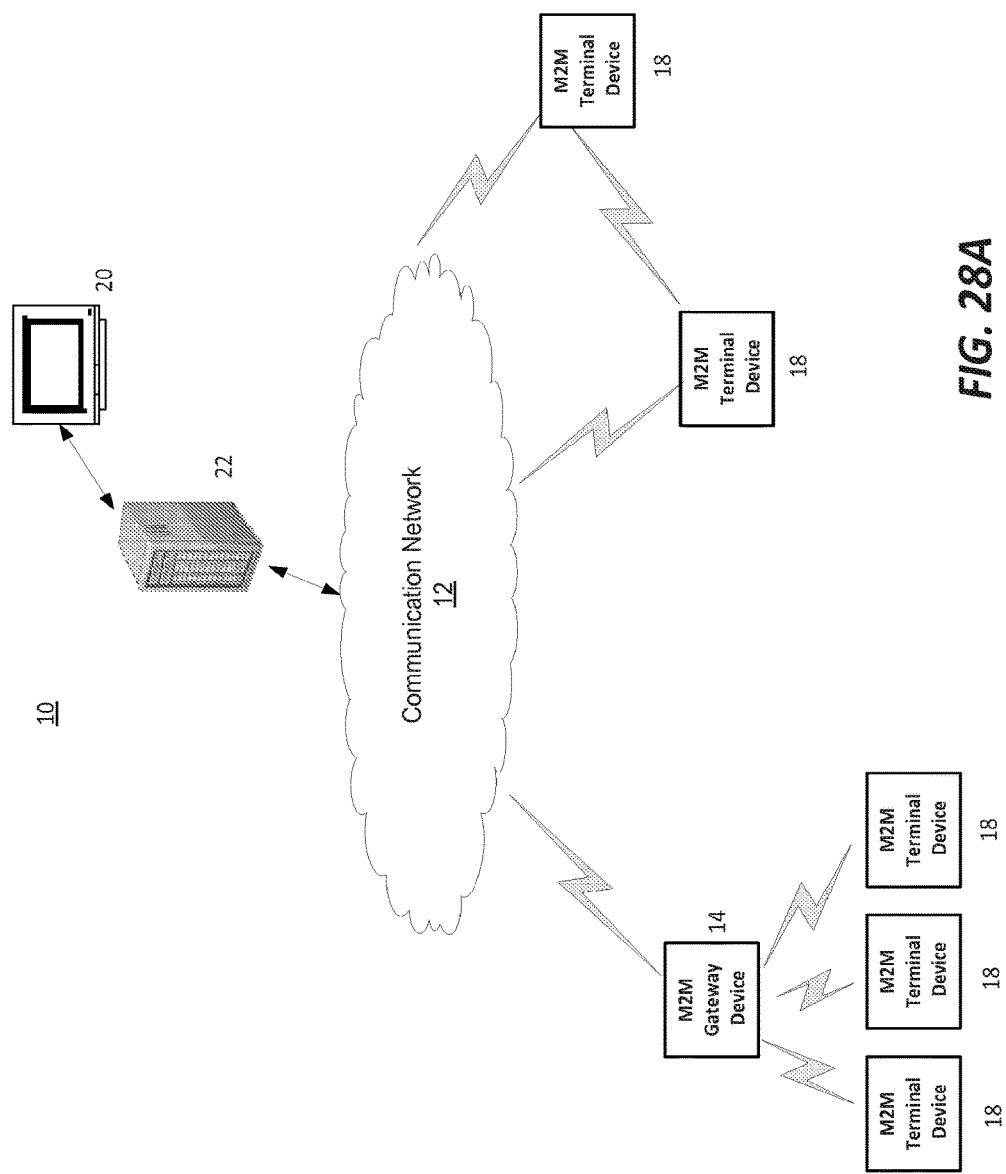
FIG. 28A is a system diagram of an example machine-to-machine (M2M) or Internet of Things (IoT) communication system in which one or more disclosed embodiments may be implemented.

FIG. 28A is a diagram of an example M2M or IoT communication system 10 in which one or more disclosed embodiments of systems and methods for load balancing in the internet of things. Generally, M2M technologies provide building blocks for the IoT, and any M2M device, gateway, or service platform may be a component of the IoT as well as an IoT service layer, etc. A service layer may be a software middleware layer that supports value-added service capabilities through a set of Application Programming Interfaces (APIs) and underlying networking interfaces. Both ETSI M2M and oneM2M use a service layer that may implement and operate the disclosed lightweight IoT information model. ETSI M2M's service layer is the Service Capability Layer (SCL). The SCL exists within M2M Device (DSCL), Gateway (GSCL) and the Network (NSCL). The oneM2M service layer supports a set of Common Service Functions (CSFs) (i.e., service capabilities). An instantiation of a set of one or more particular types of CSFs may be referred to as a Common Services Entity (CSE) that may be hosted on different types of network nodes (e.g., infrastructure node, middle node, application-specific node).

As shown in FIG. 28A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 28A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example. Any of the entities described herein, including any entities performing the functions of a resource directory, an IoT entity, an IoT device, an IoT proxy, an application, a sensor, or any other entity that may be used in any embodiment, may be implemented, executed, or otherwise enabled, partially or entirely, on devices such as M2M devices 18, gateways 14, and service platform 22. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 28B:
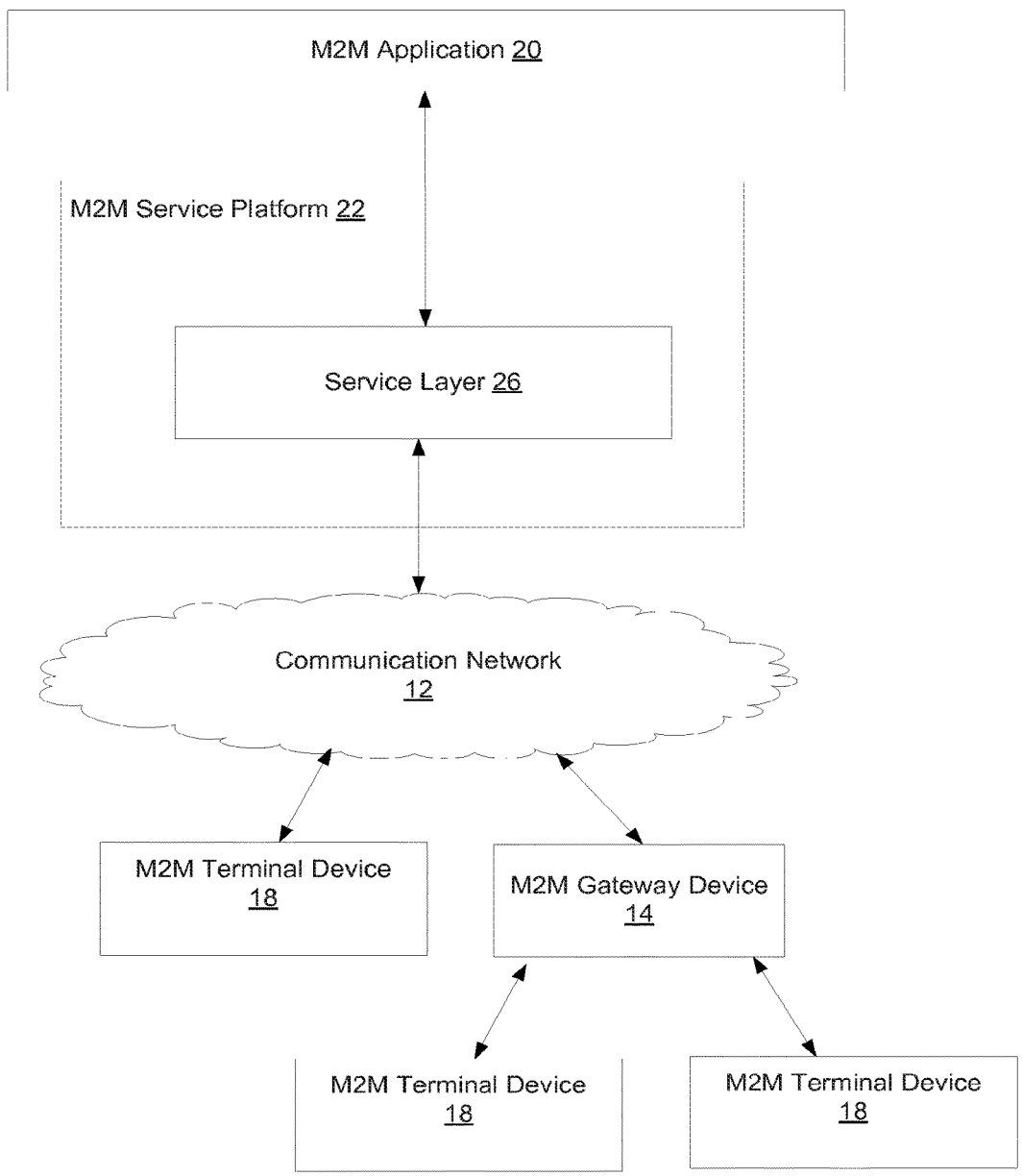
FIG. 28B is a system diagram of an example architecture that may be used within the M2M/IoT communications system illustrated in FIG. 12A.

Referring also to FIG. 28B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for load balancing in the internet of things. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 28C:
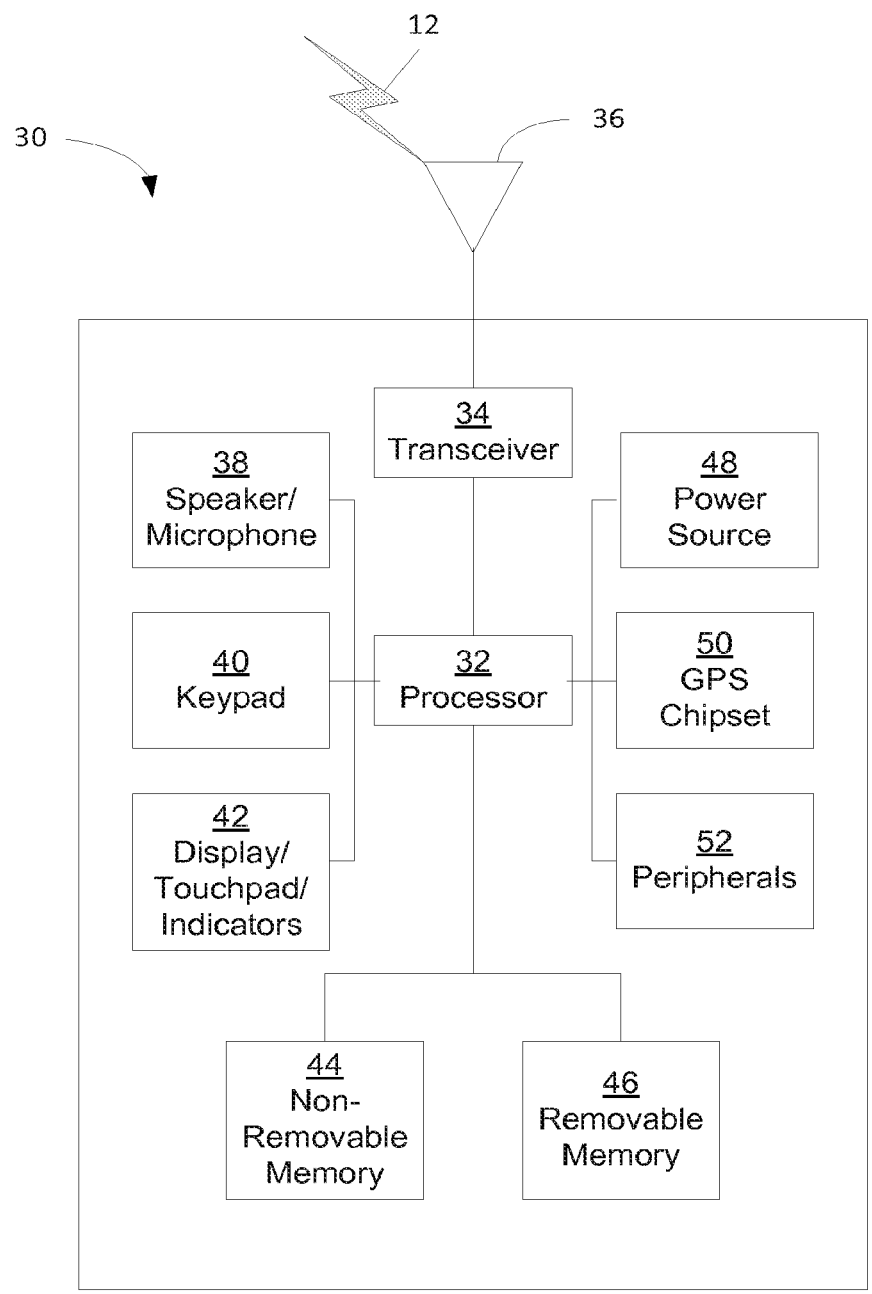
FIG. 28C is a system diagram of an example M2M/IoT terminal or gateway device that may be used within the communications system illustrated in FIG. 12A.

FIG. 28C is a system diagram of an example M2M device 30, such as an M2M terminal device 18 or an M2M gateway device 14 for example. As shown in FIG. 28C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for load balancing in the internet of things.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 28C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 28C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as those described in some of embodiments set forth herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 28D:
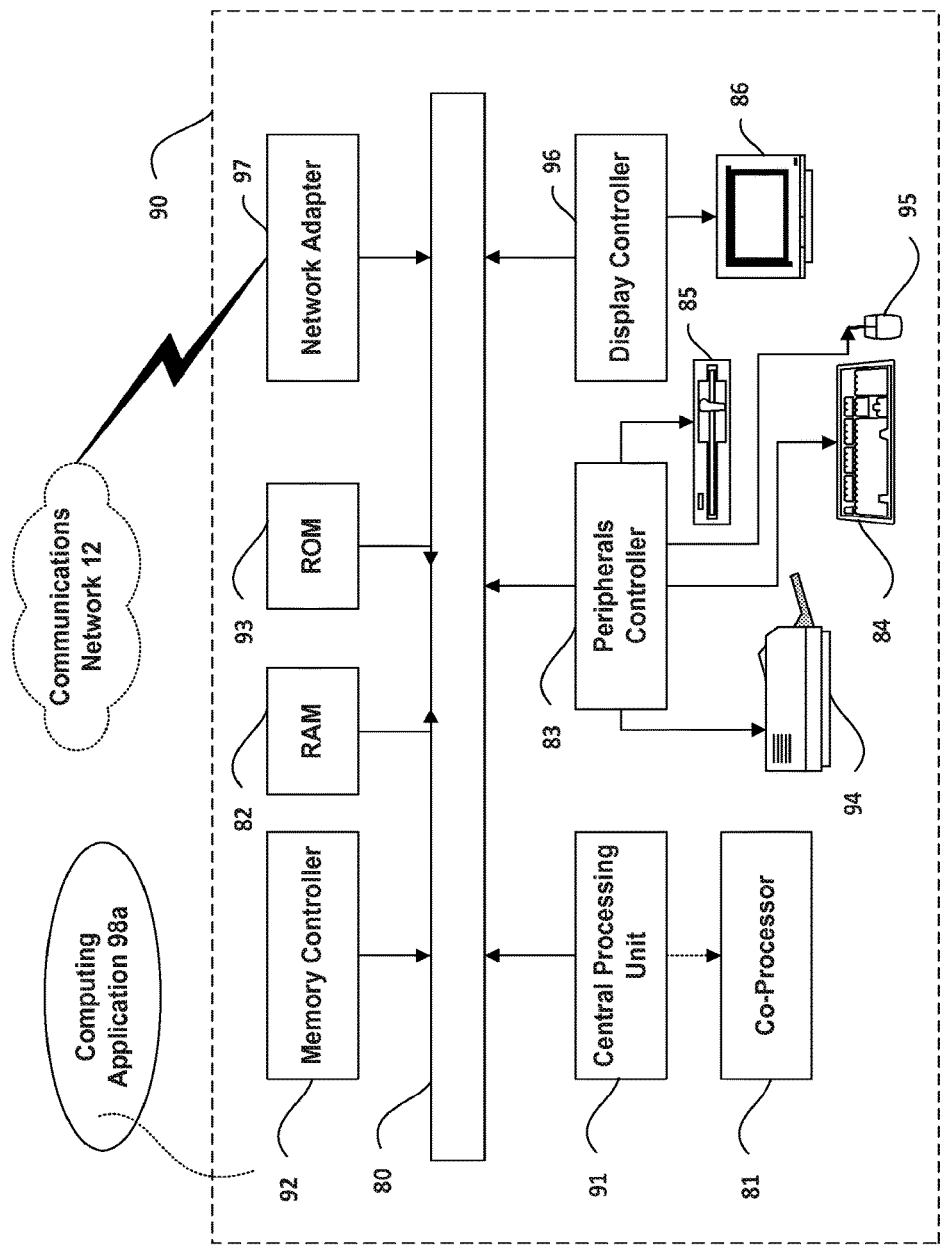
FIG. 28D is a block diagram of an example computing system in which aspects of the communication system of FIG. 12A may be embodied.

FIG. 28D is a block diagram of an exemplary computing system 90 on which, for example, the M2M service platform 22 of FIGS. 28A and 28B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for load balancing in the internet of things.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 28A and 28B. In an embodiment, network adaptor 97 may receive and transmit data related to the disclosed systems and methods for load balancing in the internet of things.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
receiving, by a load balancing proxy configured to autonomously manage one or more load balancing groups, a request to create a load balancing group, the request being automatically generated by a given device among a number of devices eligible to join the load balancing group;
creating, automatically by the load balancing proxy and based on the request to create the load balancing group, the load balancing group, wherein the load balancing group comprises at least one load balancing group resource;
receiving, by the load balancing proxy, an indication to add, to the load balancing group, a device from among the number of devices eligible to join the load balancing group;
adding, automatically by the load balancing proxy and based on the received indication, the device to the load balancing group; and
balancing, automatically by the load balancing proxy and based on the load balancing group resource, traffic associated with the devices in the load balancing group.

2. The method of claim 1, further comprising querying a resource directory to determine the number of devices eligible to join the load balancing group.

3. The method of claim 2, further comprising sending a request to the resource directory to perform one or more of removing a second device from the load balancing group and deleting the load balancing group.

4. The method of claim 1, wherein balancing traffic associated with the devices in the load balancing group comprises:
   accessing, automatically by the load balancing proxy, one or more load balancing policies; and
   balancing, automatically by the load balancing proxy, traffic associated with the devices in the load balancing group based on the one or more load balancing policies.

5. The method of claim 4, wherein the one or more load balancing policies comprise a load balancing schedule that indicates one or more time windows for sending requests to one or more of the devices in the load balancing group.

6. The method of claim 1, wherein balancing traffic associated with the devices in the load balancing group comprises:
   accessing, automatically by the load balancing proxy, one or more characteristics associated with the devices in the load balancing group; and
   balancing, automatically by the load balancing proxy, traffic associated with the devices in the load balancing group based on the one or more characteristics associated with the devices in the load balancing group.

7. The method of claim 6, wherein the one or more characteristics associated with the devices in the load balancing group comprise, for a given one of the devices in the load balancing group, a minumum amount time needed for the device to process a request, a number of parallel requests capable of being processed by the device, state information associated with the device, and information associated with a battery of the device.

8. A load balancing proxy connected to a communications network, the load balancing proxy being configured to autonomously manage one or more load balancing groups, the load balancing proxy comprising:
   a memory storing computer-executable instructions; and
   a processor that, when executing the instructions, performs operations comprising:
      receiving a request to create a load balancing group, the request being automatically generated by a given device among a number of devices eligible to join the load balancing group;
      creating, automatically and based on the request to create the load balancing group, the load balancing group, wherein the load balancing group comprises at least one load balancing group resource;
      receiving an indication to add, to the load balancing group, a device from among the number of devices eligible to join the load balancing group;
      adding, automatically and based on the received indication, the device to the load balancing group; and
      balancing, automatically and based on the load balancing group resource, traffic associated with the devices in the load balancing group.

9. The load balancing proxy of claim 8, wherein the operations further comprise querying a resource directory to determine the number of devices eligible to join the load balancing group.

10. The load balancing proxy of claim 9, wherein the operations further comprise sending a request to the resource directory to perform one or more of removing a second device from the load balancing group and deleting the load balancing group.

11. The load balancing proxy of claim 8, wherein balancing traffic associated with the devices in the load balancing group comprises:
    accessing, automatically by the load balancing proxy, one or more load balancing policies; and
    balancing, automatically by the load balancing proxy, traffic associated with the devices in the load balancing group based on the one or more load balancing policies.

12. The load balancing proxy of claim 11, wherein the one or more load balancing policies comprise a load balancing schedule that indicates one or more time windows for sending requests to one or more of the devices in the load balancing group.

13. The load balancing proxy of claim 8, wherein balancing traffic associated with the devices in the load balancing group comprises:
    accessing, automatically by the load balancing proxy, one or more characteristics associated with the devices in the load balancing group; and
    balancing, automatically by the load balancing proxy, traffic associated with the devices in the load balancing group based on the one or more characteristics associated with the devices in the load balancing group.

14. The load balancing proxy of claim 13, wherein the one or more characteristics associated with the devices in the load balancing group comprise, for a given one of the devices in the load balancing group, a minumum amount time needed for the device to process a request, a number of parallel requests capable of being processed by the device, state information associated with the device, and information associated with a battery of the device.

15. A computer-readable storage medium comprising computer-executable instructions which, when executed by a processor, cause the processor to implement a load balancing proxy configured to autonomously manage one or more load balancing groups, the load balancing proxy being further configured to perform operations comprising:
    receiving a request to create a load balancing group, the request being automatically generated by a given device among a number of devices eligible to join the load balancing group;
    creating, automatically and based on the request to create the load balancing group, the load balancing group, wherein the load balancing group comprises at least one load balancing group resource;
    receiving an indication to add, to the load balancing group, a device from among the number of devices eligible to join the load balancing group;
    adding, automatically and based on the received indication, the device to the load balancing group; and
    balancing, automatically and based on the load balancing group resource, traffic associated with the devices in the load balancing group.

16. The computer-readable storage medium of claim 15, wherein the operations further comprise querying a resource directory to determine the number of devices eligible to join the load balancing group.

17. The computer-readable storage medium of claim 15, wherein balancing traffic associated with the devices in the load balancing group comprises:
    accessing, automatically by the load balancing proxy, one or more load balancing policies; and balancing, automatically by the load balancing proxy, traffic associated with the devices in the load balancing group based on the one or more load balancing policies.

18. The computer-readable storage medium of claim 17, wherein the one or more load balancing policies comprise a load balancing schedule that indicates one or more time windows for sending requests to one or more of the devices in the load balancing group.

19. The computer-readable storage medium of claim 15, wherein balancing traffic associated with the devices in the load balancing group comprises:
   accessing, automatically by the load balancing proxy, one or more characteristics associated with the devices in the load balancing group; and
   balancing, automatically by the load balancing proxy, traffic associated with the devices in the load balancing group based on the one or more characteristics associated with the devices in the load balancing group.

20. The computer-readable storage medium of claim 19, wherein the one or more characteristics associated with the devices in the load balancing group comprise, for a given one of the devices in the load balancing group, a minumum amount time needed for the device to process a request, a number of parallel requests capable of being processed by the device, state information associated with the device, and information associated with a battery of the device.

\* \* \* \* \*